(12) United States Patent
Vu

(10) Patent No.: US 8,496,029 B2
(45) Date of Patent: Jul. 30, 2013

(54) EXTREME FLOW RATE AND/OR HIGH TEMPERATURE FLUID DELIVERY SUBSTRATES

(75) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 447 days.

(21) Appl. No.: 12/796,979

(22) Filed: Jun. 9, 2010

(65) Prior Publication Data
US 2010/0313976 A1    Dec. 16, 2010

Related U.S. Application Data

(60) Provisional application No. 61/185,829, filed on Jun. 10, 2009, provisional application No. 61/303,460, filed on Feb. 11, 2010.

(51) Int. Cl.
*F16K 1/00* (2006.01)
(52) U.S. Cl.
USPC ............................ 137/884; 137/271; 251/367
(58) Field of Classification Search
USPC ............................ 137/884, 269, 271; 251/367
See application file for complete search history.

(56) References Cited

U.S. PATENT DOCUMENTS

| 3,025,878 A | 3/1962 | Hupp |
| 3,234,964 A | 2/1966 | Tinsley et al. |
| 3,384,115 A | 5/1968 | Drazen et al. |
| 3,476,214 A | 11/1969 | Callahan |
| 3,486,519 A | 12/1969 | Olson |
| 3,509,904 A | 5/1970 | Olson |
| 3,534,797 A | 10/1970 | Reinhard |
| 3,831,951 A | 8/1974 | Patel et al. |
| 3,909,011 A | 9/1975 | Sheesley |

(Continued)

FOREIGN PATENT DOCUMENTS

| EP | 0169963 A1 | 2/1986 |
| EP | 0366909 B1 | 5/1990 |

(Continued)

OTHER PUBLICATIONS

International Preliminary Report on Patentability and Written Opinion of the International Searching Authority dated Dec. 12, 2011.
International Search Report and Written Opinion from corresponding International Application No. PCT/US2010/037922 dated Jan. 5, 2011.

(Continued)

*Primary Examiner* — Craig Schneider
*Assistant Examiner* — Ian Paquette
(74) *Attorney, Agent, or Firm* — Lando & Anastasi, LLP

(57) ABSTRACT

A flow substrate including a body having a first surface and a second opposing surface, a plurality of pairs of ports defined in the first surface of the body, a plurality of fluid pathways extending between each respective pair of ports and in fluid communication with each port of the respective pair of ports, and at least one cap. Each fluid pathway is formed in the second surface of the body. The at least one cap has a first surface constructed to seal at least one fluid pathway, and a second opposing surface. At least one of the body and the at least one cap includes a weld formation formed in at least one of the second surface of the body and the second surface of the at least one cap constructed to surround the at least one fluid pathway and facilitate welding of the at least one cap to the body along the weld formation.

16 Claims, 33 Drawing Sheets

U.S. PATENT DOCUMENTS

| | | |
|---|---|---|
| 3,915,194 A | 10/1975 | Fredrich |
| 3,934,605 A | 1/1976 | Legris |
| 3,993,091 A | 11/1976 | Loveless |
| 4,008,736 A | 2/1977 | Wittmann-Liebold et al. |
| 4,067,531 A | 1/1978 | Sikula |
| 4,080,752 A | 3/1978 | Burge |
| 4,082,324 A | 4/1978 | Obrecht |
| 4,093,329 A | 6/1978 | Asbill, III |
| 4,168,724 A | 9/1979 | Graffunder et al. |
| 4,181,141 A | 1/1980 | Stoll et al. |
| 4,247,133 A | 1/1981 | Moller |
| 4,304,120 A | 12/1981 | Myers et al. |
| 4,352,532 A | 10/1982 | Hardin |
| 4,378,123 A | 3/1983 | Largent et al. |
| 4,432,392 A | 2/1984 | Paley |
| 4,490,083 A | 12/1984 | Rebish |
| 4,524,807 A | 6/1985 | Toliusis |
| 4,558,845 A | 12/1985 | Hunkapillar |
| 4,681,476 A | 7/1987 | Mischenko |
| 4,714,091 A | 12/1987 | Wagner |
| 4,773,446 A | 9/1988 | Farnsworth et al. |
| 4,807,660 A | 2/1989 | Aslanian |
| 4,815,280 A | 3/1989 | Tujimura et al. |
| 4,815,496 A | 3/1989 | Nishitani et al. |
| 4,921,072 A | 5/1990 | Divisi |
| 4,984,460 A | 1/1991 | Isoda |
| 5,141,021 A | 8/1992 | Shimomura et al. |
| 5,178,191 A | 1/1993 | Schaefer |
| 5,255,553 A | 10/1993 | Hale et al. |
| 5,275,074 A | 1/1994 | Taylor et al. |
| 5,292,224 A | 3/1994 | Torli et al. |
| 5,303,584 A | 4/1994 | Ogasawara et al. |
| 5,303,731 A | 4/1994 | Vavra et al. |
| 5,361,805 A | 11/1994 | Mayeux |
| 5,368,062 A | 11/1994 | Okumura et al. |
| 5,410,912 A | 5/1995 | Suzuki |
| 5,439,026 A | 8/1995 | Moriya et al. |
| 5,440,477 A | 8/1995 | Rohrberg et al. |
| 5,460,204 A | 10/1995 | Rossi |
| 5,488,915 A | 2/1996 | McNeill |
| 5,488,925 A | 2/1996 | Kumada |
| 5,529,088 A | 6/1996 | Asou |
| 5,605,179 A | 2/1997 | Strong, Jr. et al. |
| 5,653,259 A | 8/1997 | Ramstad |
| 5,657,786 A | 8/1997 | DuRoss et al. |
| 5,662,143 A | 9/1997 | Caughran |
| 5,711,342 A | 1/1998 | Kazama et al. |
| 5,713,582 A | 2/1998 | Swensen et al. |
| 5,720,317 A | 2/1998 | Nimberger |
| 5,730,181 A | 3/1998 | Doyle et al. |
| 5,730,448 A | 3/1998 | Swensen et al. |
| 5,732,744 A | 3/1998 | Barr |
| 5,735,532 A | 4/1998 | Nolan et al. |
| 5,735,533 A | 4/1998 | Nolan et al. |
| 5,749,562 A | 5/1998 | Moller et al. |
| 5,769,110 A | 6/1998 | Ohmi et al. |
| 5,794,645 A | 8/1998 | Rohrberg et al. |
| 5,819,782 A | 10/1998 | Itafuji |
| 5,836,355 A | 11/1998 | Markulec et al. |
| 5,860,676 A | 1/1999 | Brzezicki et al. |
| 5,915,409 A | 6/1999 | Kaneko et al. |
| 5,918,616 A | 7/1999 | Sanfilippo et al. |
| 5,967,489 A | 10/1999 | Nakazawa et al. |
| 5,975,590 A | 11/1999 | Cowan et al. |
| 5,979,910 A | 11/1999 | Shinohara et al. |
| 5,979,944 A | 11/1999 | Yokoyama et al. |
| 5,983,933 A | 11/1999 | Ohmi et al. |
| 5,984,318 A | 11/1999 | Kojima et al. |
| 5,988,217 A | 11/1999 | Ohmi et al. |
| 5,992,463 A | 11/1999 | Redemann et al. |
| 6,007,108 A | 12/1999 | Braun |
| 6,012,479 A | 1/2000 | Fukushima et al. |
| 6,035,609 A | 3/2000 | Evans et al. |
| 6,035,893 A | 3/2000 | Ohmi et al. |
| 6,036,107 A | 3/2000 | Aspen et al. |
| 6,039,360 A | 3/2000 | Ohmi et al. |
| 6,048,041 A | 4/2000 | Mueller et al. |
| 6,056,291 A | 5/2000 | Inagaki et al. |
| 6,062,605 A | 5/2000 | Goshima et al. |
| 6,068,016 A | 5/2000 | Manofsky, Jr. et al. |
| 6,073,646 A | 6/2000 | Kimura |
| 6,076,543 A | 6/2000 | Johnson |
| 6,085,783 A | 7/2000 | Hollingshead |
| 6,109,303 A | 8/2000 | Itafuji et al. |
| 6,116,282 A | 9/2000 | Yamaji et al. |
| 6,116,283 A | 9/2000 | Yamaji et al. |
| 6,123,340 A | 9/2000 | Sprafka et al. |
| 6,125,887 A | 10/2000 | Pinto |
| 6,135,155 A | 10/2000 | Ohmi et al. |
| 6,142,164 A | 11/2000 | Wier et al. |
| 6,152,175 A | 11/2000 | Itoh et al. |
| 6,170,890 B1 | 1/2001 | Ohmi et al. |
| 6,186,177 B1 | 2/2001 | Maher |
| 6,209,571 B1 | 4/2001 | Itoh et al. |
| 6,231,260 B1 | 5/2001 | Markulec et al. |
| 6,241,254 B1 | 6/2001 | Gromyko et al. |
| 6,257,270 B1 | 7/2001 | Ohmi et al. |
| 6,257,592 B1 | 7/2001 | Hasizawa et al. |
| 6,260,581 B1 | 7/2001 | Hollingshead |
| 6,260,854 B1 | 7/2001 | Lemon |
| 6,273,139 B1 | 8/2001 | Ohmi et al. |
| 6,283,155 B1 | 9/2001 | Vu |
| 6,293,310 B1 | 9/2001 | Redemann et al. |
| 6,298,881 B1 | 10/2001 | Curran et al. |
| 6,302,141 B1 | 10/2001 | Markulec et al. |
| 6,349,744 B1 | 2/2002 | Grosshart |
| 6,361,081 B1 | 3/2002 | Yokoyama et al. |
| 6,363,958 B1 | 4/2002 | Ollivier |
| 6,374,859 B1 | 4/2002 | Vu et al. |
| 6,382,238 B2 | 5/2002 | Ishii et al. |
| 6,382,257 B2 | 5/2002 | Mead et al. |
| 6,394,138 B1 | 5/2002 | Vu et al. |
| 6,408,879 B1 | 6/2002 | Ohmi et al. |
| 6,422,264 B2 | 7/2002 | Ohmi et al. |
| 6,450,200 B1 | 9/2002 | Ollivier |
| 6,502,601 B2 | 1/2003 | Eidsmore et al. |
| 6,523,570 B2 | 2/2003 | Weiss et al. |
| 6,546,960 B1 | 4/2003 | Rohrberg et al. |
| 6,546,961 B2 | 4/2003 | Fukushima |
| 6,615,871 B2 | 9/2003 | Ohmi et al. |
| 6,629,546 B2 | 10/2003 | Eidsmore et al. |
| 6,634,385 B2 | 10/2003 | Symington |
| 6,640,835 B1 | 11/2003 | Rohrberg et al. |
| 6,644,353 B1 | 11/2003 | Eidsmore |
| 6,729,353 B2 | 5/2004 | Nguyen |
| 6,736,370 B1 | 5/2004 | Crockett et al. |
| 6,874,538 B2 | 4/2005 | Bennett |
| 6,953,048 B2 | 10/2005 | Chuh |
| 7,018,940 B2 | 3/2006 | Dunham |
| 7,048,008 B2 | 5/2006 | Milburn |
| 7,213,618 B2 | 5/2007 | Milburn et al. |
| 7,258,139 B2 | 8/2007 | Perusek et al. |
| 7,404,417 B2 * | 7/2008 | Eidsmore ..................... 137/884 |
| 7,448,276 B2 | 11/2008 | Crockett et al. |
| 7,459,003 B2 | 12/2008 | Crockett et al. |
| 8,042,573 B2 | 10/2011 | Tokuda et al. |
| 2003/0079686 A1 | 5/2003 | Chen et al. |
| 2003/0106597 A1 | 6/2003 | Ichikawa et al. |
| 2004/0129324 A1 | 7/2004 | Vu |
| 2005/0028878 A1 | 2/2005 | Reid, II et al. |
| 2005/0266582 A1 | 12/2005 | Modlin et al. |
| 2005/0284529 A1 * | 12/2005 | Iwabuchi ..................... 137/884 |
| 2007/0267081 A1 * | 11/2007 | Perusek et al. ............... 137/884 |
| 2007/0289652 A1 * | 12/2007 | Curran et al. ............... 137/884 |
| 2008/0166884 A1 | 7/2008 | Nelson et al. |
| 2008/0202614 A1 * | 8/2008 | Mamyo et al. ............... 137/884 |

FOREIGN PATENT DOCUMENTS

| | | |
|---|---|---|
| EP | 0777259 A1 | 6/1997 |
| EP | 0837278 A1 | 4/1998 |
| EP | 0754896 B1 | 5/2002 |
| EP | 0908929 B1 | 1/2004 |
| GB | 1533202 | 11/1978 |
| GB | 2178139 A | 2/1987 |
| JP | 2-261983 | 10/1990 |

| | | |
|---|---|---|
| JP | 5-172265 | 7/1993 |
| JP | 06241400 | 8/1994 |
| JP | 7-071403 | 3/1995 |
| JP | 7-074113 | 3/1995 |
| JP | 7-286720 | 10/1995 |
| JP | 08227836 | 9/1996 |
| JP | 2865644 | 3/1999 |
| JP | 11351500 A | 12/1999 |
| WO | WO 9825058 | 6/1998 |
| WO | WO 99/45302 A1 | 9/1999 |
| WO | WO 01/16512 A1 | 3/2001 |
| WO | WO 2004/088772 A2 | 10/2004 |

OTHER PUBLICATIONS

"Physics and Chemistry of Speciality Gases for Advanced Semiconductor Processings II, Advanced Gas Technology—key to high performance Semiconductor process," Sponsored by Ultra Clean Society, $18^{18}$ Workshop on ULSI Ultra Clean Society, Jun. 26-27, 1992, pp. 15-24.

"What You Can Get in Manifolds", Hydraulics and Pneumatics, vol. 16, No. 11, pp. 88-89, Nov. 1963.

\* cited by examiner

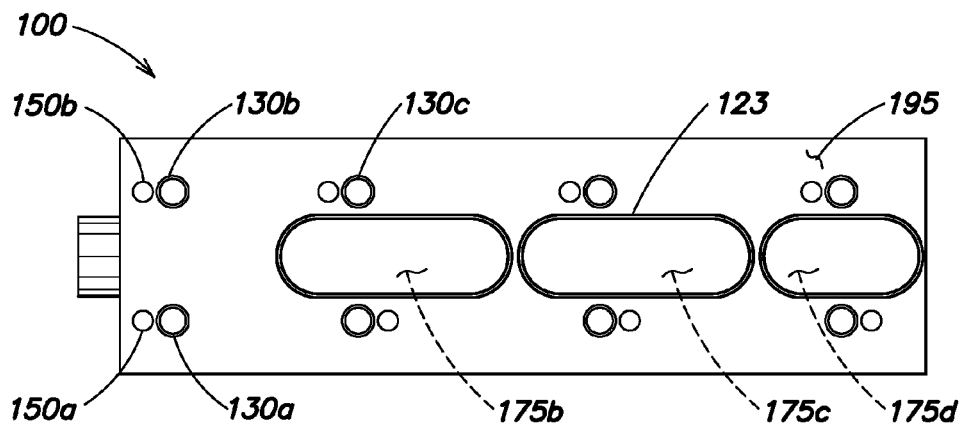
FIG. 1C
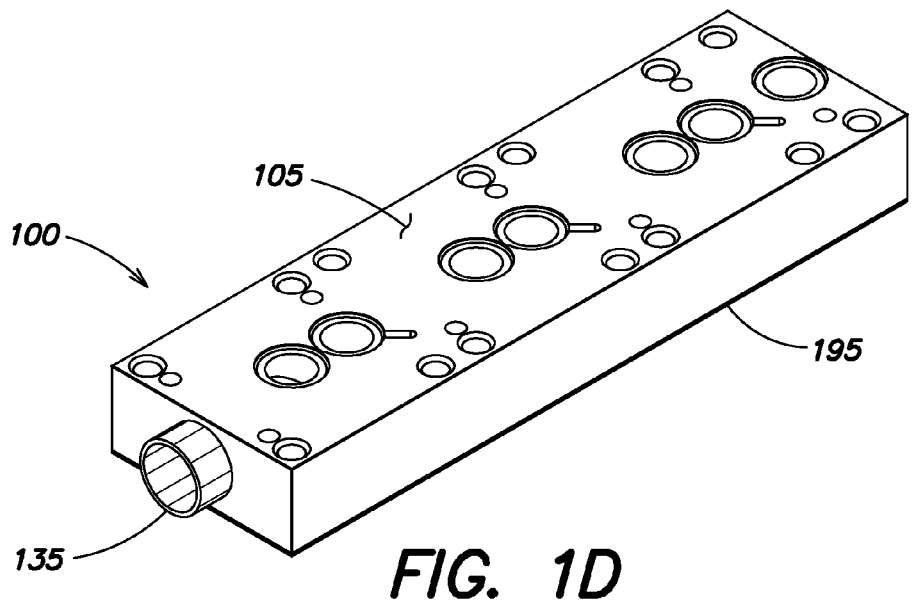
FIG. 1D
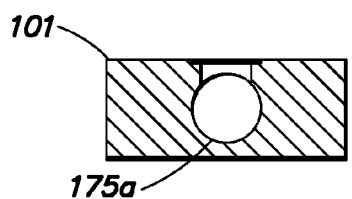 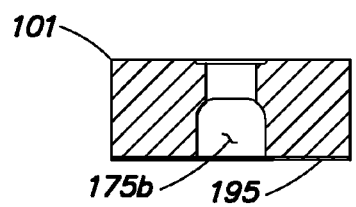
FIG. 1E    FIG. 1F

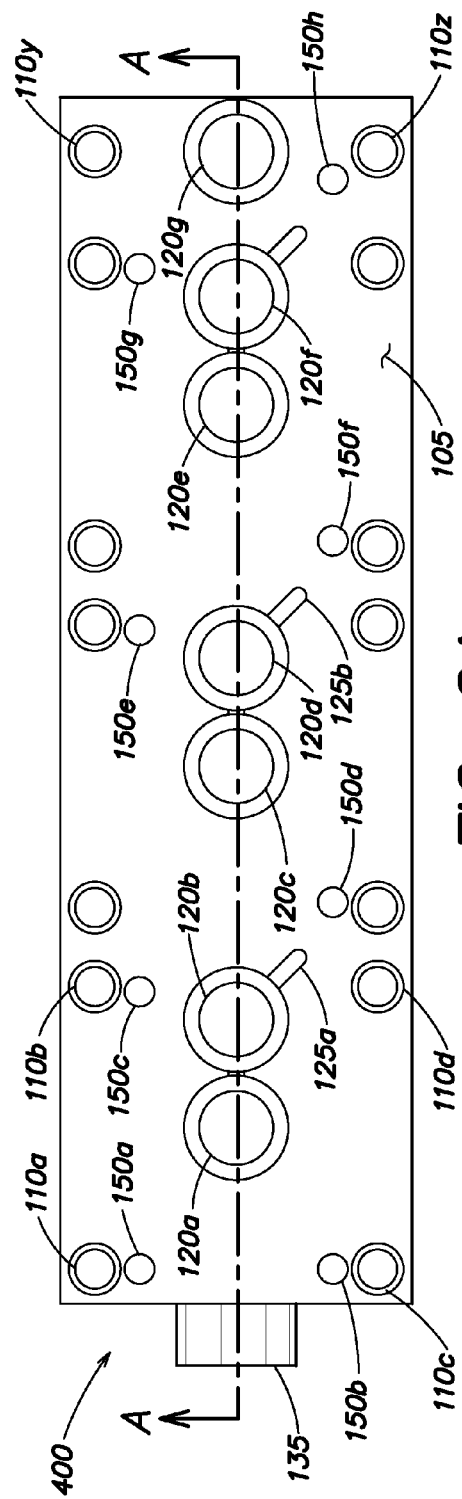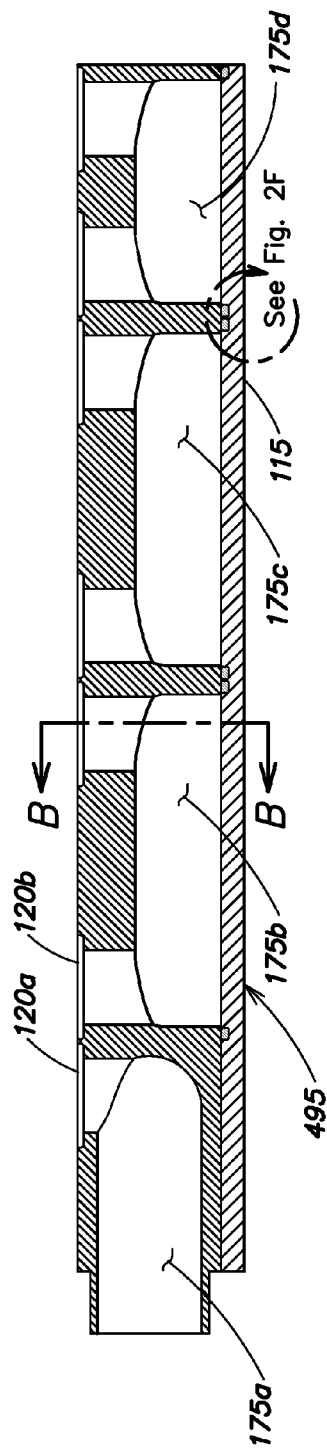
FIG. 2A
FIG. 2B

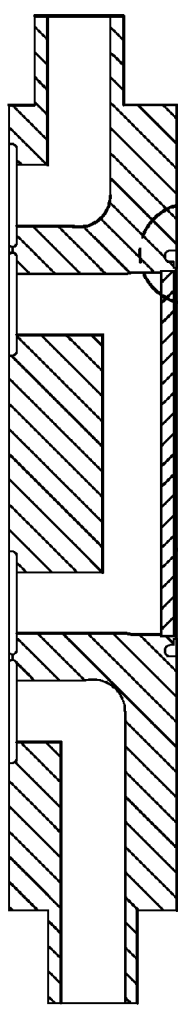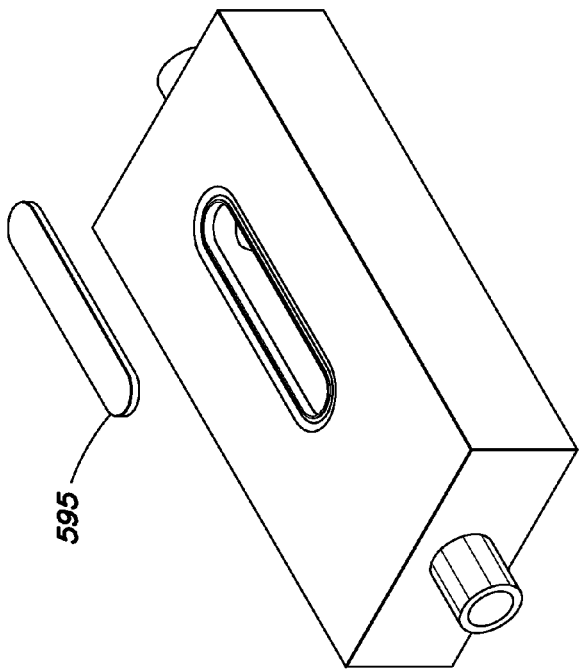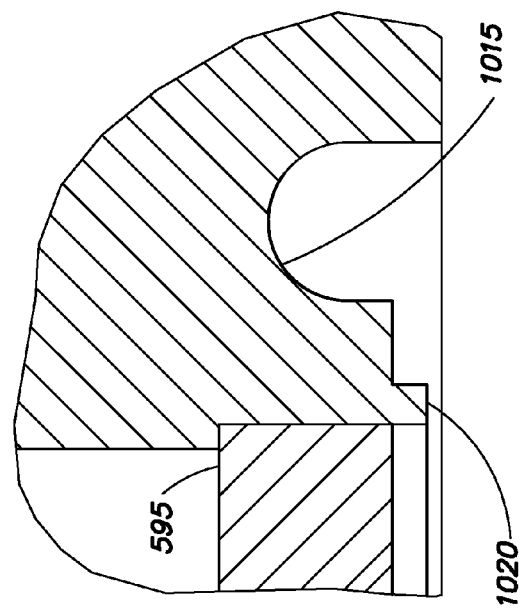

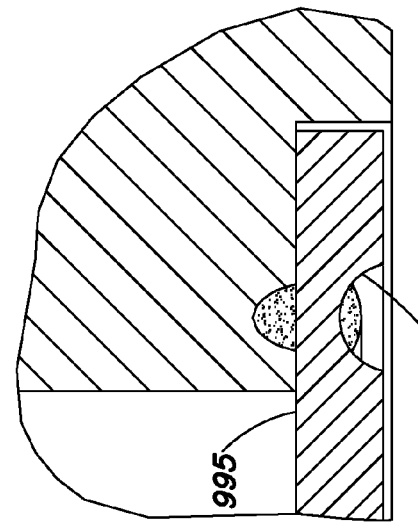
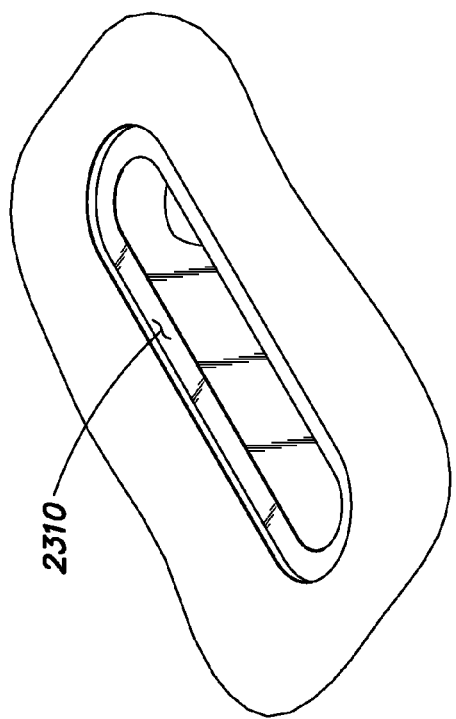
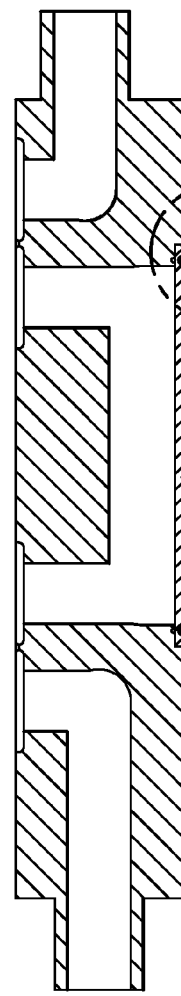

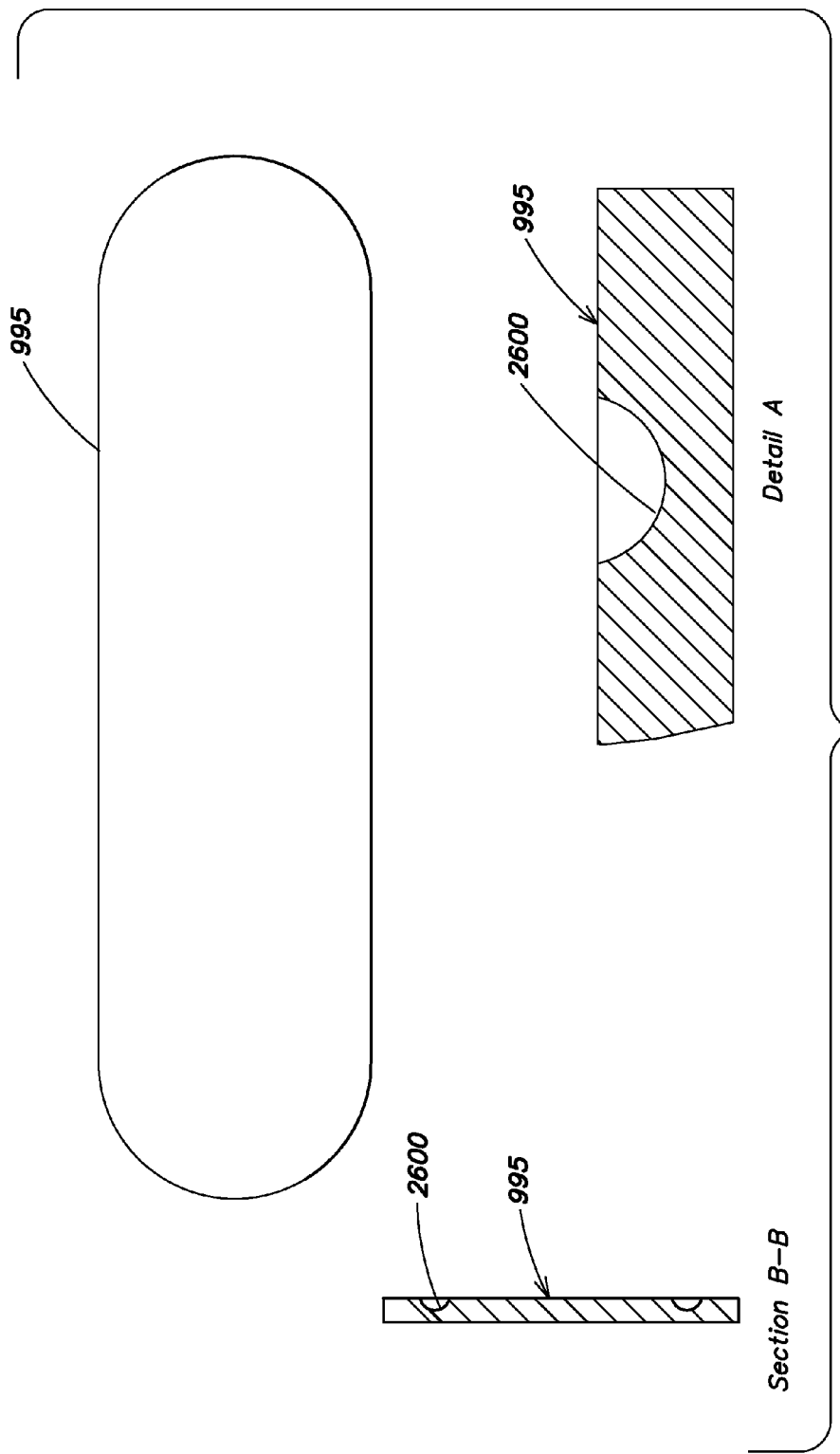

EXTREME FLOW RATE AND/OR HIGH TEMPERATURE FLUID DELIVERY SUBSTRATES

RELATED APPLICATIONS

This application claims priority under 35 U.S.C. §119(e) to U.S. Provisional Patent Application Ser. No. 61/185,829, entitled "HIGH FLOW RATE AND/OR HIGH TEMPERATURE FLUID DELIVERY SUBSTRATES," filed on Jun. 10, 2009, and to U.S. Provisional Patent Application Ser. No. 61/303,460, entitled "EXTREME FLOW RATE AND/OR HIGH TEMPERATURE FLUID DELIVERY SUBSTRATES," filed on Feb. 11, 2010, each of which is herein incorporated by reference in its entirety. This application is related to U.S. patent application Ser. No. 12/777,327, entitled "FLUID DELIVERY SUBSTRATES FOR BUILDING REMOVABLE STANDARD FLUID DELIVERY STICKS, filed May 11, 2010, which is incorporated by reference herein in its entirety.

BACKGROUND OF THE INVENTION

1. Field of the Invention

The present invention is directed to fluid delivery systems, and more particularly to extreme flow rate and/or high temperature surface mount fluid delivery systems for use in the semiconductor processing and petrochemical industries.

2. Discussion of the Related Art

Fluid delivery systems are used in many modern industrial processes for conditioning and manipulating fluid flows to provide controlled admittance of desired substances into the processes. Practitioners have developed an entire class of fluid delivery systems which have fluid handling components removably attached to flow substrates containing fluid pathway conduits. The arrangement of such flow substrates establishes the flow sequence by which the fluid handling components provide the desired fluid conditioning and control. The interface between such flow substrates and removable fluid handling components is standardized and of few variations. Such fluid delivery system designs are often described as modular or surface mount systems. Representative applications of surface mount fluid delivery systems include gas panels used in semiconductor manufacturing equipment and sampling systems used in petrochemical refining. The many types of manufacturing equipment used to perform process steps making semiconductors are collectively referred to as tools. Embodiments of the present invention relate generally to fluid delivery systems for semiconductor processing and specifically to surface mount fluid delivery systems that are specifically well suited for use in extreme flow rate and/or high temperature applications where the process fluid is to be heated to a temperature above ambient. Aspects of the present invention are applicable to surface mount fluid delivery system designs whether of a localized nature or distributed around a semiconductor processing tool.

Industrial process fluid delivery systems have fluid pathway conduits fabricated from a material chosen according to its mechanical properties and considerations of potential chemical interaction with the fluid being delivered. Stainless steels are commonly chosen for corrosion resistance and robustness, but aluminum or brass may be suitable in some situations where cost and ease of fabrication are of greater concern. Fluid pathways may also be constructed from polymer materials in applications where possible ionic contamination of the fluid would preclude using metals. The method of sealingly joining the fluid handling components to the flow substrate fluid pathway conduits is usually standardized within a particular surface mount system design in order to minimize the number of distinct part types. Most joining methods use a deformable gasket interposed between the fluid component and the flow substrate to which it is attached. Gaskets may be simple elastomeric O-Rings or specialized metal sealing rings such as seen in U.S. Pat. No. 5,803,507 and U.S. Pat. No. 6,357,760. Providing controlled delivery of high purity fluids in semiconductor manufacturing equipment has been of concern since the beginning of the semiconductor electronics industry and the construction of fluid delivery systems using mostly metallic seals was an early development. One early example of a suitable bellows sealed valve is seen in U.S. Pat. No. 3,278,156, while the widely used VCR® fitting for joining fluid conduits is seen in U.S. Pat. No. 3,521,910, and a typical early diaphragm sealed valve is seen in U.S. Pat. No. 5,730,423 for example. The recent commercial interest in photovoltaic solar cell fabrication, which has less stringent purity requirements than needed for making the newest microprocessor devices, may bring a return to fluid delivery systems using elastomeric seals.

A collection of fluid handling components assembled into a sequence intended for handling a single fluid species is frequently referred to as a gas stick. The equipment subsystem comprised of several gas sticks intended to deliver process fluid to a particular semiconductor processing chamber is often called a gas panel. During the 1990s several inventors attacked problems of gas panel maintainability and size by creating gas sticks wherein the general fluid flow path is comprised of passive metallic structures, containing the conduits through which process fluid moves, with valves and like active (and passive) fluid handling components removably attached thereto. The passive fluid flow path elements have been variously called manifolds, substrates, blocks, and the like, with some inconsistency even within the work of individual inventors. This disclosure chooses to use the terminology flow substrate to indicate fluid delivery system elements which contain passive fluid flow path(s) that may have other fluid handling devices mounted there upon.

SUMMARY OF THE INVENTION

Embodiments of the present invention are directed to a surface mount fluid delivery flow substrate that is specifically adapted for use in extreme flow rate and/or high temperature applications where the process fluid is to be heated (or cooled) to a temperature above (or below) that of the ambient environment. As used herein, and in the context of semiconductor process fluid delivery systems, the expression "extreme flow rate" corresponds to gas flow rates above approximately 50 SLM or below approximately 50 SCCM. A significant aspect of the present invention is the ability to fabricate flow substrates having fluid pathway conduits with a cross-sectional area (size) substantially larger or smaller than other surface mount architectures.

Flow substrates in accordance with the present invention may be used to form a portion of a gas stick, or may be used to form an entire gas stick. Certain embodiments of the present invention may be used to implement an entire gas panel using only a single flow substrate. Flow substrates of the present invention may be securely fastened to a standardized stick bracket, such as that described in Applicant's co-pending patent application Ser. No. 12/777,327, filed on May 11, 2010 (hereinafter, "Applicant's co-pending application"), thereby providing firm mechanical alignment and thereby obviating need for any interlocking flange structures among the flow substrates. In addition, flow substrates of the present invention may be adapted as described in Applicant's copending application to additionally provide one or more manifold connection ports and thereby allow transverse connections between fluid delivery sticks.

The flow substrate configurations of the present invention may be adjusted for use with valves and other fluid handling components having symmetric port placement (e.g., W-seal™ devices) or asymmetric port placement (e.g., standard "C-Seal" devices) on the valve (or other fluid handling component) mounting face. Only asymmetric designs are shown herein because such devices are most commonly available in the semiconductor equipment marketplace.

In accordance with one aspect of the present invention, a flow substrate is provided. The flow substrate comprises a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each component conduit port of the respective pair of component conduit ports, each respective fluid pathway being formed in the second surface of the substrate body; and at least one cap. The at least one cap is formed from a second material and has a first surface that is constructed to seal at least one fluid pathway of the plurality of fluid pathways, and a second surface opposing the first surface of the at least one cap. At least one of the substrate body and the at least one cap includes a weld formation formed in at least one of the second surface of the substrate body and the second surface of the at least one cap, wherein the weld formation is constructed to surround the at least one fluid pathway and facilitate welding of the at least one cap to the substrate body along the weld formation.

In accordance with one embodiment, the component conduit ports extend through the substrate body to the second surface of the substrate body, and the first material and the second material are stainless steel of the same alloy type. In another embodiment, the first material may be a stainless steel, and the second material may be a nickel alloy, such as a Hastelloy® corrosion resistant metal alloy, available from Haynes International, Inc.

In accordance with another embodiment, the substrate body includes a first weld formation formed in the second surface of the substrate body and the at least one cap includes a second weld formation formed in the second surface of the at least one cap.

In accordance with yet another embodiment, the at least one cap includes the weld formation, wherein the weld formation includes a groove formed in the second surface of the at least one cap. In accordance with one aspect of this embodiment, the groove facilitates welding of the at least one cap to the substrate body by identifying the location of where the at least one cap is to be welded to the substrate body and by reducing the power needed to weld the at least one cap to the substrate body. In accordance with another aspect of this embodiment, the groove may be formed in the second surface of the at least one cap by chemical etching. In a further aspect of this embodiment, the at least one cap has a thickness of approximately 0.5 mm, and the groove has a depth of approximately 0.25 mm In accordance with a further aspect of this embodiment, the flow substrate may further comprise a plate formed from a rigid material and constructed to be disposed adjacent the second surface of the at least one cap, and may additionally comprise a sheet heater, wherein the sheet heater is constructed to be disposed between the plate and the second surface of the at least one cap.

In accordance with another embodiment, the at least one cap includes a plurality of weld formations, each weld formation of the plurality of weld formations including a respective groove formed in the second surface of the at least one cap, each respective groove of the plurality of grooves surrounding a respective one of the plurality of fluid pathways.

In accordance with yet another embodiment, the at least one cap includes a plurality of caps corresponding to each of the plurality of fluid pathways, each respective cap of the plurality of caps including a respective groove formed in the second surface of the respective cap.

In accordance with another embodiment, the substrate body includes the weld formation formed in the second surface of the substrate body, the weld formation including a recessed weld wall surface surrounding the at least one fluid pathway. In accordance with one aspect of this embodiment, the weld formation further includes a stress relief groove surrounding the recessed weld wall surface. In accordance with another aspect of this embodiment, the weld formation further includes a swaged lip surrounding the at least one fluid pathway and disposed between the at least one fluid pathway and the recessed weld wall surface, and in a further aspect of this embodiment, the weld formation further includes a stress relief groove surrounding the recessed weld wall surface.

In accordance with another embodiment, the flow substrate forms a portion of a gas stick for conveying one of semiconductor process fluids and sampling fluids and petrochemical fluids, and in another embodiment, the flow substrate forms substantially all of a fluid delivery panel.

In accordance with another aspect of the invention, a flow substrate is provided. The fluid flow substrate comprises a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each component conduit port of the respective pair of component conduit ports, each respective fluid pathway being formed in the second surface of the substrate body; a plurality of seals corresponding to each of the plurality of fluid pathways; and at least one cap. The at least one cap is formed from a second material, the at least one cap having a first surface that is constructed to seal at least one fluid pathway of the plurality of fluid pathways, and a second surface opposing the first surface of the at least one cap. The at least one cap is configured to receive and retain at least one seal of the plurality of seals in registration with the at least one cap and to form a fluid tight seal with the at least one fluid pathway upon compression against the substrate body.

In accordance with one embodiment, the component conduit ports extend through the substrate body to the second surface of the substrate body.

In accordance with one embodiment, the first material and the second material are plastic, and in accordance with another embodiment, the first material is plastic, and the second material is metal.

In accordance with one embodiment, the at least one cap includes a groove formed in the first surface of the at least one cap and dimensioned to retain the at least one seal. In accordance with a further aspect of this embodiment, the groove is formed in the first surface of the at least one cap by one of molding and machining.

In accordance with another embodiment, the at least one cap includes a plurality of grooves formed in the first surface of the at least one cap, each respective groove of the plurality of grooves being dimensioned to retain a respective seal of the plurality of seals.

In accordance with yet another embodiment, the at least one cap includes a plurality of caps corresponding to each of the plurality of fluid pathways, each respective cap of the plurality of caps being configured to receive and retain a respective seal of the plurality of seals between the first and second surfaces of the respective cap. In accordance with a further aspect of this embodiment, the first and second surfaces of each respective cap are separated by an intermediate portion of the respective cap, the intermediate portion having a smaller cross sectional extent than either of the first and second surfaces of the respective cap, and in a further aspect of this embodiment, the first and second surfaces of each respective cap are dimensioned to be the same.

In accordance with another embodiment, the flow substrate may further comprise a plate formed from a rigid material and constructed to be disposed adjacent the second surface of the at least one cap and to compress the at least one cap against the substrate body.

In accordance with another aspect of the present invention, a flow substrate is provided comprising a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each conduit port of the respective pair of component conduit ports, each respective fluid pathway being formed in the second surface of the substrate body; and a cap. The cap is formed from a second material and has a first surface to be placed in registration with the second surface of the substrate body, and a second surface opposing the first surface of the cap. The second surface of the cap has a plurality of weld formations formed therein, each respective weld formation of the plurality of weld formations being constructed to surround a respective fluid pathway of the plurality of fluid pathways and define a location where the cap is to be welded to the second surface of the substrate body.

In accordance with one embodiment, the first material and the second material are stainless steel of the same alloy type, the cap has a thickness of approximately 0.5 mm, and each of the plurality of weld formations includes a groove having a depth of approximately 0.25 mm.

In accordance with a further embodiment, the flow substrate may further comprise a plate formed from a rigid material and constructed to be disposed adjacent the second surface of the cap, and a sheet heater constructed to be disposed between the plate and the second surface of the cap.

In accordance with an aspect of the present invention, the flow substrate may form at least a portion a gas stick for conveying one of semiconductor process fluids and sampling fluids and petrochemical fluids.

In accordance with another aspect of the present invention, a flow substrate is provided comprising a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each conduit port of the respective pair of component conduit ports, each respective fluid pathway being formed in the second surface of the substrate body; and a plurality of caps. Each of the plurality of caps are formed from a second material, each respective cap of the plurality of caps having a first surface to seal a respective fluid pathway of the plurality of fluid pathways and a second surface opposing the first surface of the respective cap. Each respective cap of the plurality of caps including a weld formation, formed in the second surface of the respective cap, and constructed to surround a respective fluid pathway of the plurality of fluid pathways and facilitate welding of the respective cap to the substrate body along the weld formation.

In accordance with one aspect of this embodiment, the substrate body may include a plurality of weld formations formed in the second surface of the substrate body and surrounding a respective one of the plurality of fluid pathways.

In accordance with yet another aspect of the present invention, a flow substrate is provided. The flow substrate comprises a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each conduit port of the respective pair of component conduit ports, each respective fluid pathway being formed in the second surface of the substrate body; a plurality of weld formations, formed in the second surface of the substrate body, each respective weld formation of the plurality of weld formations surrounding a respective fluid pathway of the plurality of fluid pathways; and a plurality of caps. Each of the plurality of caps may be formed from a second material, and each respective cap of the plurality of caps is constructed to be welded to the substrate body along a respective weld formation of the plurality of weld formations.

In accordance with one embodiment, each respective weld formation includes a swaged lip surrounding a respective fluid pathway.

In accordance with another embodiment, each respective cap of the plurality of caps includes a first surface constructed to seal a respective fluid pathway of the plurality of fluid pathways and a second surface opposing the first surface, wherein each respective cap includes a weld formation formed in the second surface of the respective cap to facilitate welding of the respective cap to the substrate body.

In accordance with yet another aspect of the present invention, a flow substrate is provided comprising a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each conduit port of the respective pair of component conduit ports, each respective fluid pathway being formed in the second surface of the substrate body; a plurality of seals corresponding to each of the plurality of fluid pathways; and a cap. The cap is formed from a second material and configured to be attached to the second surface of the substrate body. The cap has a first surface that to be disposed in registration with the second surface of the substrate body, and a second surface opposing the first surface of the cap, the cap including a plurality of grooves defined therein. Each respective groove of the plurality of grooves is constructed to surround a respective fluid pathway of the plurality of fluid pathways and to receive a respective seal of the plurality of seals.

In accordance with one aspect of this embodiment, each respective groove of the plurality of grooves is dimensioned to receive and retain a respective seal of the plurality of seals within the respective grove prior to attachment of the cap to second surface of the substrate body.

In accordance with another aspect of the present invention, a flow substrate is provided. The flow substrate comprises a substrate body formed from a solid block of a first material, the substrate body having a first surface and a second surface opposing the first surface; a plurality of pairs of component conduit ports defined in the first surface of the substrate body; a plurality of fluid pathways extending between each respective pair of component conduit ports and in fluid communication with each conduit port of the respective pair of component conduit ports, each respective fluid pathway being formed in the second surface of the substrate body; a plurality of seals corresponding to each of the plurality of fluid pathways; and a plurality of caps formed from a second material and corresponding to each of the plurality of fluid pathways. Each respective cap of the plurality of caps is constructed to receive and retain a respective seal of the plurality of seals and to form a fluid tight seal with a respective fluid pathway of the plurality of fluid pathways upon compression of the respective cap against the substrate body.

In accordance with an aspect of this embodiment, the flow substrate may further comprise a plate formed from a rigid material and constructed to be disposed in registration with the second surface of the substrate body and to compress each of the plurality of caps against the substrate body.

In accordance with an aspect of each of the above described embodiments, a first fluid pathway of the plurality of fluid pathways may have a different cross-sectional area than a second fluid pathway of the plurality of fluid pathways. In addition, in accordance with each of the above-described embodiments, the plurality of fluid pathways may be a first plurality of fluid pathways that extend between each respective pair of component conduit ports in a first direction, and wherein the flow substrate further includes at least one second fluid pathway formed in one of the first surface and the second surface of the substrate body that extends in a second direction that is transverse to the first direction.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1C illustrates a view of the flow substrate of FIGS. 1A and 1B from below;

FIG. 1D is an elevational view of the flow substrate of FIGS. 1A-C;

FIG. 1E is a cross-sectional view of the flow substrate of FIG. 1B taken along line B-B in FIG. 1B;

FIG. 1F is a cross-sectional view of the flow substrate of FIG. 1B taken along line C-C in FIG. 1B;

FIG. 2A is a plan view of a second embodiment of a flow substrate in accordance with the present invention;

FIG. 2B is a cross-sectional view of the flow substrate of FIG. 2A taken along line A-A in FIG. 2A;

FIG. 4E is a cross-sectional view of a flow substrate of FIGS. 4A-D in which the weld cap is shown in position;

FIG. 4F is an exploded cross-sectional view of a portion of the flow substrate of FIG. 4E;

FIG. 4G is an elevational view of the flow substrate of FIGS. 4A-F from below;

FIG. 8C is an exploded elevational view of a portion of the flow substrate of FIGS. 8A-B from below showing the fifth weld preparation;

FIG. 8D is a cross-sectional view of the flow substrate of FIGS. 8A-C in which the weld cap is shown in position;

FIG. 8E is an exploded cross-sectional view of a portion of the flow substrate and cap of FIG. 8D;

FIGS. 9A-B illustrate various views of a weld cap for use with the flow substrates of FIGS. 7-8 in accordance with an aspect of the present invention;

DETAILED DESCRIPTION

Figure 1A:
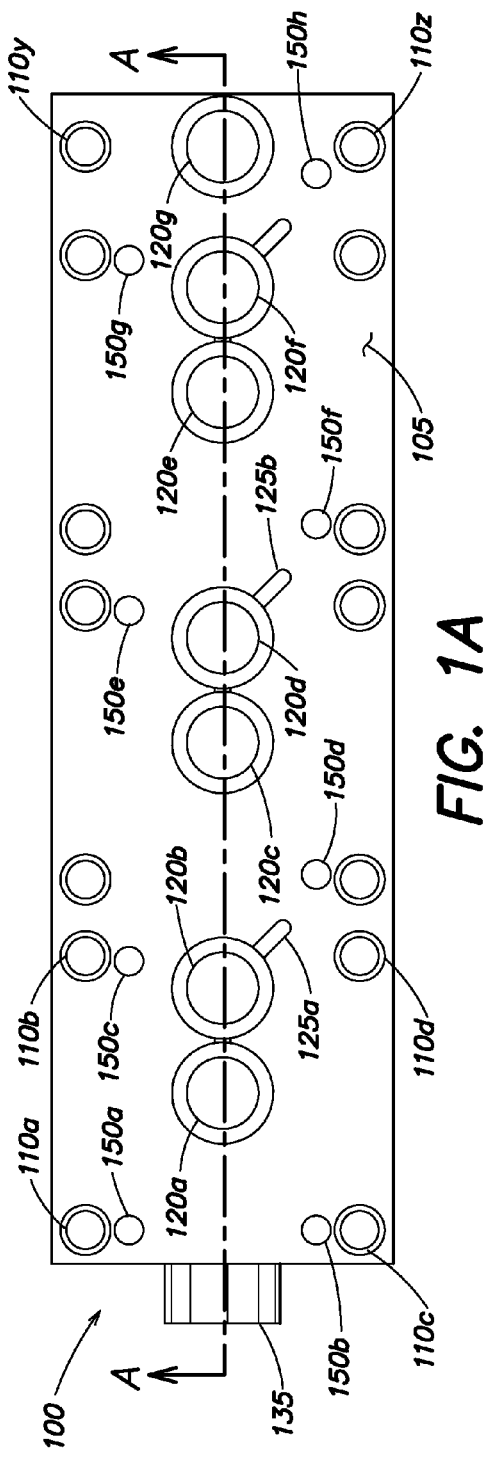
FIG. 1A is a plan view of a first embodiment of a flow substrate in accordance with the present invention.
Figure 1B:
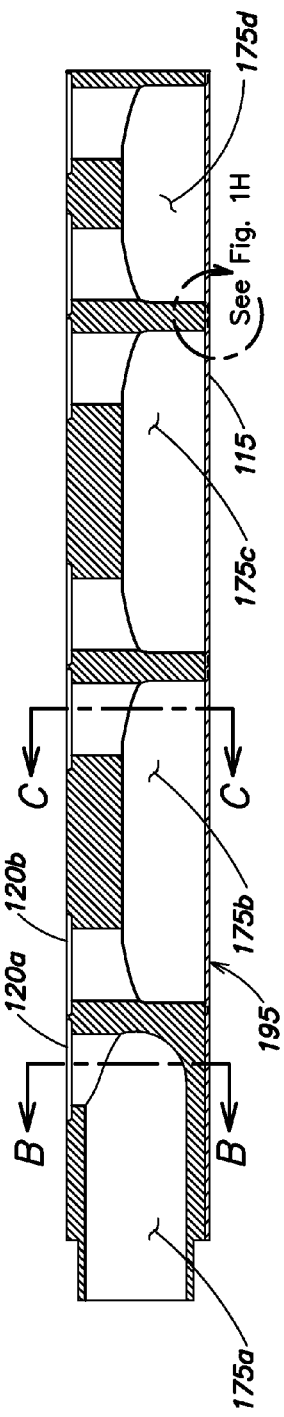
FIG. 1B is a cross-sectional view of the flow substrate of FIG. 1A taken along line A-A in FIG. 1A.
Figure 1G:
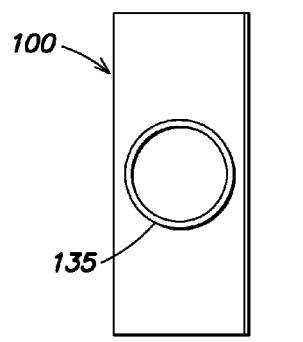
FIG. 1G is an end view of the flow substrate of FIGS. 1A-F.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It should be appreciated that the fluid materials manipulated in the fluid delivery flow substrates of the present invention may be a gaseous, liquid, or vaporous substance that may change between liquid and gas phase dependent upon the specific temperature and pressure of the substance. Representative fluid substances may be a pure element such as argon (Ar), a vaporous compound such as boron trichloride (BCl3), a mixture of normally liquid silicon tetrachloride (SiCl4) in carrier gas, or an aqueous reagent.

FIGS. 1A-J illustrate a modular flow substrate in accordance with an embodiment of the present invention for use with fluid handling components having asymmetric port placement (e.g., C-seal components) in which one of the ports of the fluid handling component is axially aligned with the center of the component and the other is situated off axis. Although not shown in the figures, it should be appreciated that embodiments of the present invention may be modified for use with fluid handling components have a symmetric port placement, such as W-Seal™ components.

As shown, the flow substrate 100 includes a substrate body 101 formed from a solid block of material and an associated cap 195 (see FIG. 1I), each of which may be formed from a suitable material (such as stainless steel) in accordance with the intended use of the flow substrate. The substrate 100 includes a component attachment surface 105 to which a fluid handling component (such as a valve, pressure transducer, filter, regulator, mass flow controller, etc.) is attached. Formed in the component attachment surface 105 of the flow substrate are one or more component conduit ports 120. Component conduit port 120a would typically be fluidly connected to a first port (inlet or outlet) of a first fluid handling component, while component port 120b would typically be fluidly connected to the second port (outlet or inlet) of the first fluid handling component; component conduit port 120c would typically be fluidly connected to the port (outlet or inlet) of a second fluid handling component that is distinct form the first fluid handling component.

Component conduit ports 120c and 120d and component conduit ports 120e and 120f would each be respectively connected to the inlet and outlet of a respective fluid handling component and illustrate how the flow substrate 100 is specifically suited to fluid handling components having asymmetric port placement. Component port 120g would typically be associated with the inlet or outlet port of a device, such as a mass flow controller, that might be used to communicate the flow of process fluid between flow substrates of a fluid delivery stick.

Associated with component conduit ports 120a and 120b are a plurality of internally threaded component mounting apertures 110a, 110b, 110c, and 110d, each of which would receive the threaded end of a fastener (not shown) that is used to sealingly mount a fluid handling component to the flow substrate 100. Associated with conduit port 120g are a pair of internally threaded component mounting apertures 110y, 110z, each of which would receive the threaded end of a fastener (not shown) to sealingly mount a port of a fluid handling component, such as a mass flow controller to the flow substrate 100. It should be appreciated that an adjacent flow substrate in the fluid delivery stick would typically provide an additional pair of mounting apertures needed to sealingly mount the other port of the fluid handling component to the adjacent flow substrate. Associated with each pair of component conduit ports is a leak port 125a (for component conduit ports 120a and 120b), and 125b (for component conduit ports 120*c* and 120*d*) that permits any leakage between the conduit ports and the respective fluid handling component to be detected.

The flow substrate 100 includes a number of fluid pathways 175*a*, 175*b*, 175*c*, and 175*d* that are used to convey fluid in a longitudinal direction (i.e., from left to right in FIG. 1A) along the flow substrate 100. For example, fluid pathway 175*a* extends between a tube stub connection 135 and component conduit port 120*a*, fluid pathway 175*b* extends between component conduit ports 120*b* and 120*c*, fluid pathway 175*c* extends between component conduit port 120*d* and component conduit port 120*e*, and fluid pathway 175*d* extends between component conduit port 120*f* and 120*g*. Tube stub connection 135 would typically be fluidly connected (for example, by welding) to a source or sink of process fluid.

A plurality of dowel pin apertures 150*a* through 150*h* are formed in the flow substrate 100 that extend from the component attachment surface 105 through to a connection attachment surface 115 on a side of the flow substrate opposing the component attachment surface 105. The connection attachment surface 115 may be used to connect the substrate 100 to a fluid delivery stick bracket, to a manifold, or both, such as described in Applicant's co-pending application. Each of these dowel pin apertures 150*a*-150*h* can receive a dowel pin (not shown) that may be used to perform different functions. A first function is to align the cap 195 with the body 101 of the flow substrate 100, and a second is to align the flow substrate with a fluid delivery stick bracket in a manner similar to that described in Applicant's co-pending application. It should be appreciated that in certain installations, only the first of these functions may be performed, such that after alignment (and welding as described further in detail below), the dowel pin may be removed and re-used with another flow substrate body and cap. In accordance with a further aspect of the present invention, the location of the dowel pin may be backwards compatible with existing modular flow substrate systems, for example, the K1s system.

FIG. 1C illustrates a view of the flow substrate 100 from below in which a plurality of flow substrate mounting apertures 130 are visible. The plurality of flow substrate mounting apertures 130 are formed in the cap 195 and extend through the cap 195 and into the body 101 of the flow substrate (shown more clearly in FIG. 1I). Within the flow substrate body, the flow substrate mounting apertures 130 are internally threaded to receive a fastener (not shown) to mount the flow substrate 100 to a mounting surface, such as a fluid delivery stick bracket, from below. The placement of the flow substrate mounting apertures 130 may be varied depending upon the placement of mounting apertures in the mounting surface to which the flow substrate 100 is to be attached.

As can be seen in the figures, component conduit ports 120 and fluid pathways 175 are all machined in a cost-effective manner Thus, component conduit ports 120*a*-120*g* may each be formed by machining from the component attachment surface 105 into a first or top surface of the body 101 of the flow substrate 100, fluid pathways 175*b*, 175*c*, and 175*d* may each be respectively formed by machining from a second or bottom surface of the body 101 of the flow substrate as shown in FIG. 1F, and fluid pathway 175*a* may be formed by machining from a side surface of the body of the flow substrate as shown in FIG. 1E. The fluid pathways 175 may be treated to enhance their corrosion resistance. It should be appreciated that the dimensions of the fluid pathways 175 depicted in the figures are particularly well suited for higher flow rates, such as those above approximately 50 SLM. Indeed, the dimensions of the fluid pathways depicted in the figures permit the flow substrate 100 to be used in high flow rate applications (e.g., between approximately 50-100 SLM) as well as very high flow rate applications (e.g., those above approximately 200 SLM). Thus, embodiments of the present invention may be used with emerging semiconductor manufacturing equipment that is designed to operate at very high flow rates between approximately 200 SLM to 1000 SLM. It should be appreciated that the dimensions of the fluid pathways may be scaled down for lower flow applications in a straight-forward manner, for example, simply by reducing the cross-sectional area of one or more of the fluid pathways 175*b*, 175*c*, and 175*d*. Indeed, because the component conduit ports 120 are formed in a different process step than the fluid pathways, the dimensions of the fluid pathways are not constrained by the dimensions of the component conduit ports, and thus, the cross-sectional area of the fluid pathways may be significantly larger, smaller, or the same as that of the component conduit ports to accommodate a wide range of flow rates.

Figure 1H:
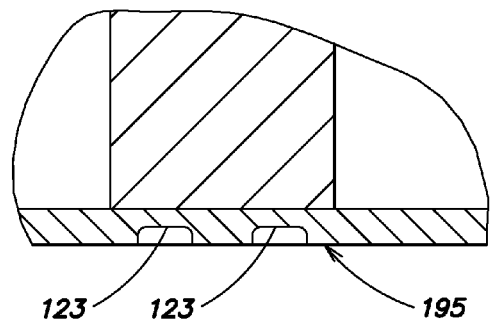
FIG. 1H is an exploded view of a portion of the flow substrate depicted in FIG. 1B.
Figure 1I:
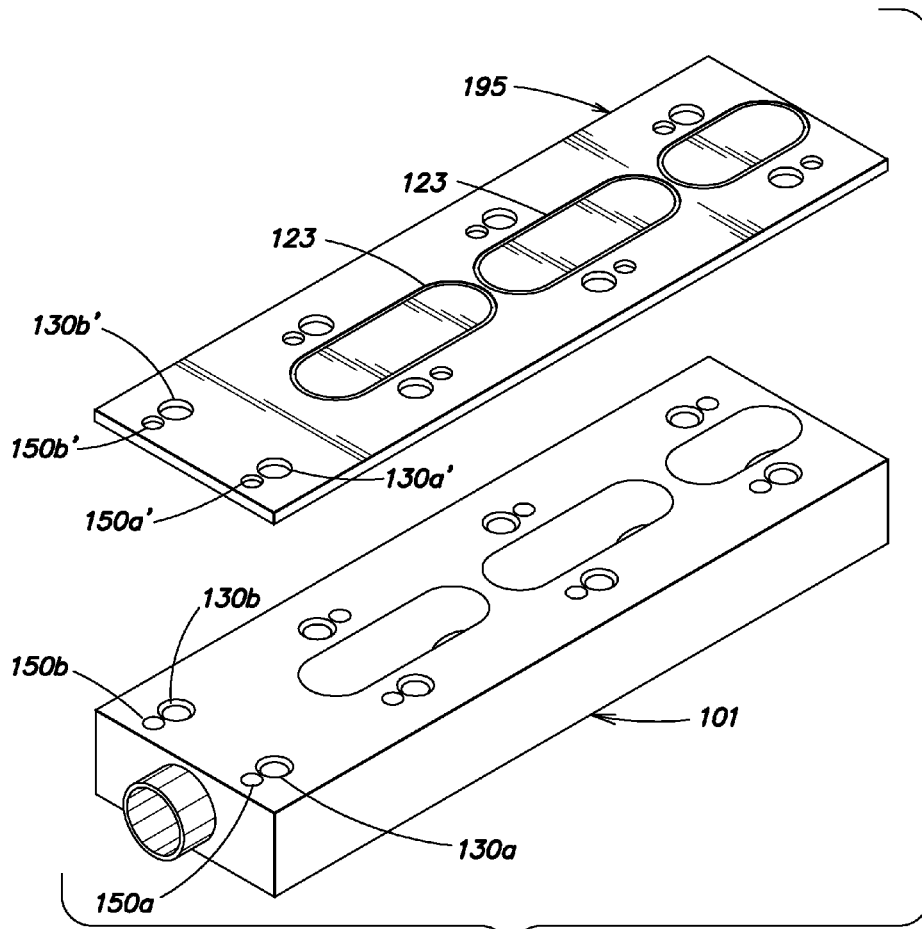
FIG. 1I is an elevational view of the flow substrate of FIGS. 1A-H from below.
Figure 1J:
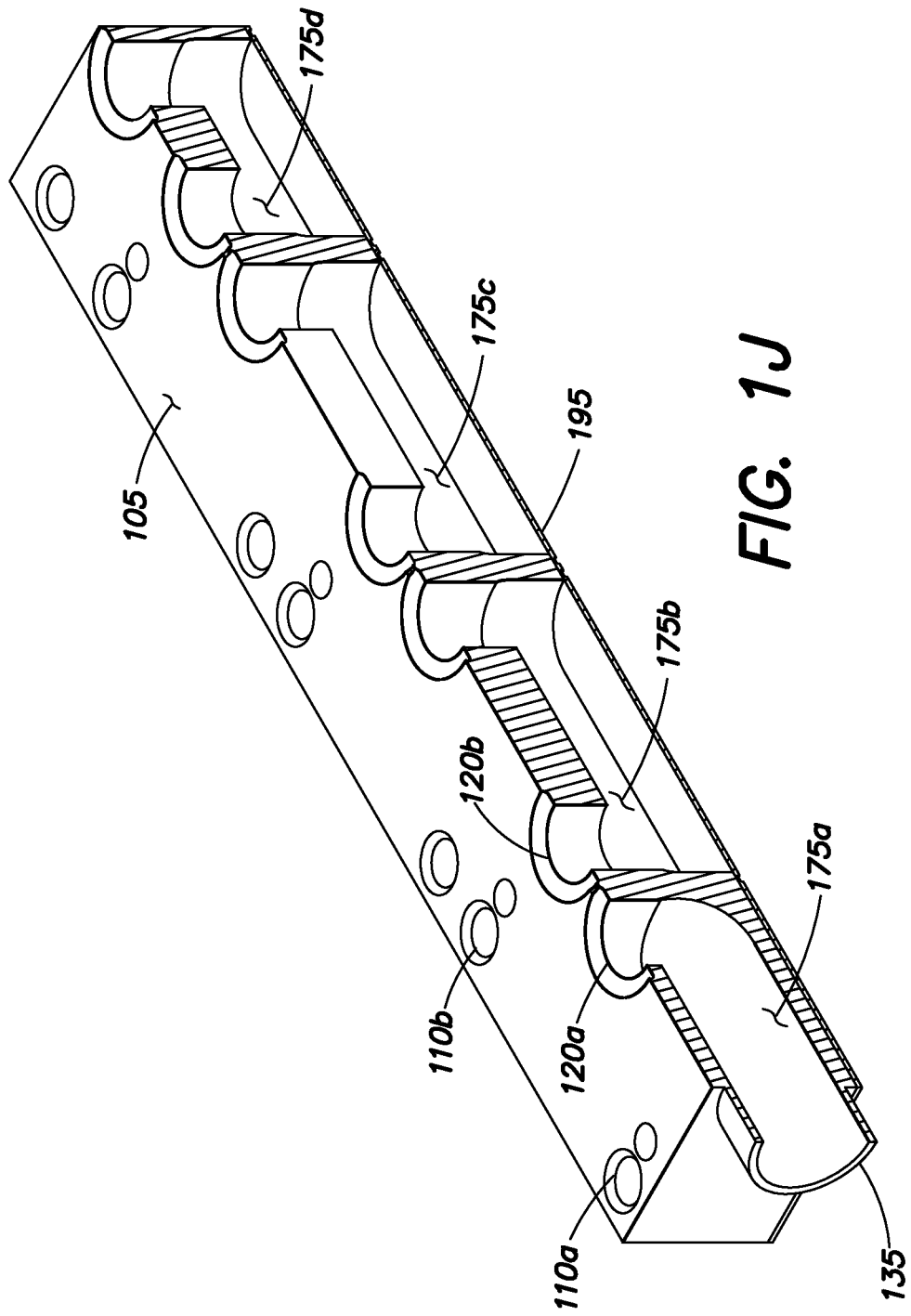
FIG. 1J is a cut-away elevational view of the flow substrate of FIGS. 1A-I.

FIGS. 1H and 1I illustrate various details of the cap 195 in accordance with an aspect of the present invention. In accordance with one embodiment that is specifically adapted for use with semiconductor process fluids that may frequently be heated to a temperature above ambient, the cap 195 is formed from a thin sheet of stainless steel approximately 0.02 inches (0.5 mm) thick. The thinness of the sheet of stainless steel permits heat to be readily transferred to the process fluids flowing in the flow substrate by application of heat to the connection attachment surface 115 of the substrate. The source of heat may be provided by a block heater, by a cartridge heater inserted into a groove of a fluid delivery stick bracket to which the flow substrate is attached in a manner similar to that described in Applicant's co-pending application, or by a thin film heater, such as that described in U.S. Pat. No. 7,307,247. It should be appreciated that the thinness of the cap also permits fluid flowing in the flow substrate to be cooled, should that be desired.

In accordance with one aspect of the present invention, the sheet of stainless steel may be chemically etched to form groves 123 that surround and define the fluid pathways 175*b*, 175*c*, and 175*d*. Such chemical etching may be accurately performed, and can be less expensive than other method of forming groves, such as by machining, which may alternatively be used. In accordance with one embodiment, the groves may be etched to a thickness of approximately 0.01 inches (0.25 mm). The presence of the grooves 123 surrounding and defining each fluid pathway 175*b*, 175*c*, and 175*d* serves a number of purposes. For example, the thinness of the grooves permits the cap to be welded to the body 101 of the flow substrate, for example, by electron beam welding, using less time and energy than if the grooves 123 were not present. The welding would be performed by tracing around each fluid pathway defined by the groove, thereby forming a fluid tight seal. The electron beam welding may be performed in a vacuum environment to minimize any contamination. Where the materials being used for the flow substrate body 101 and cap 195 are high purity metals, such as stainless steel, the vacuum welding environment acts to further eliminate contaminants (such as Carbon, Sulfur, Manganese, etc.) at the point of the weld. Although electron beam welding is generally preferred, it should be appreciated that other types of welding, such as laser welding may also be used.

The presence of the grooves 123 also serves as a guide during welding, since the grooves define the periphery of the fluid pathway. Dowel pin holes 150*a*, 150*b* in the body 101 of the flow substrate and corresponding dowel pin holes 150*a'*, 150*b'* in the cap 195 receive a dowel pin that permits the cap 195 to be aligned with and held in registration with the body of the flow substrate 100 during welding. The dowel pins may be removed and re-used after welding is complete, or kept in place as an aid for aligning the flow substrate with a mounting surface.

It should be appreciated that although only four fluid pathways are illustrated in the figures, the ease and low cost of manufacturing embodiments of the present invention readily permits any number of fluid pathways and component ports to be defined in the flow substrate. In this regard, all of the fluid pathways and component connection ports for an entire fluid delivery stick may be formed in a single flow substrate. Alternatively, a fluid delivery stick may be formed by using two or more flow substrates such as the flow substrate 100 described above.

FIGS. 2A-H illustrate a modular flow substrate in accordance with another embodiment of the present invention. Like the first embodiment, this embodiment is specifically adapted for use with fluid handling components having asymmetric port placement (e.g., C-seal components) in which one of the ports of the fluid handling component is axially aligned with the center of the component and the other is situated off axis. Although not shown in the figures, it should be appreciated that this embodiment, like the previous embodiment, may be modified for use with fluid handling components have a symmetric port placement, such as W-Seal™ components. This second embodiment, like the first, is specifically adapted for use in higher volume (i.e., higher flow rate) applications, but may be adapted for use in lower volume applications, such as those below approximately 50 SCCM, as well. As this second embodiment shares many similar design aspects as the first, only differences are described in detail below.

As shown, the flow substrate 400 includes a substrate body 401 formed from a solid block of material and an associated cap 495 (see FIG. 2G), each of which may be formed from a suitable material (such as stainless steel) in accordance with the intended use of the flow substrate. Primarily for cost reasons, but also for those applications that warrant the use of non-metallic materials (such as where ionic contamination is a concern), the body 401 and/or cap 495 of the flow substrate may also be formed (e.g., molded or machined) from polymeric materials, such as plastic. The use of other materials, such as plastic, permits the flow substrate 400 to be particularly well suited to chemical delivery applications or biological applications where ionic contamination is a concern, and/or applications where cost is a concern.

As in the first embodiment, flow substrate 400 includes a component attachment surface 105 to which a fluid handling component (such as a valve, pressure transducer, filter, regulator, mass flow controller, etc.) is attached. Formed in the component attachment surface 105 of the flow substrate 400 are one or more component conduit ports 120, having similar functionality as that described with respect to the first embodiment. Associated with each of the component conduit ports 120 are a plurality of internally threaded component mounting apertures 110a, 110b, 110c, 110d, 110y, and 110z, each of which would receive the threaded end of a fastener (not shown) that is used to sealingly mount a fluid handling component (not shown) to the flow substrate 400 in a manner similar to that described previously. Associated with each pair of component conduit ports is a leak port 125a (for component conduit ports 120a and 120b), and 125b (for component conduit ports 120c and 120d) that permits any leakage between the conduit ports and the respective fluid handling component to be detected.

As in the first embodiment, the flow substrate 400 includes a number of fluid pathways 175a, 175b, 175c, and 175d that are used to convey fluid in a longitudinal direction (i.e., from left to right in FIG. 2A) along the flow substrate 400. As previously described, tube stub connection 135 would typically be fluidly connected (for example, by welding, or by using a suitable adhesive, such as an epoxy) to a source or sink of process fluid.

As in the first embodiment, a plurality of dowel pin apertures 150a through 150h are formed in the flow substrate 400 that extend from the component attachment surface 105 through to a connection attachment surface 115 on a side of the flow substrate opposing the component attachment surface. The connection attachment surface 115 may be used to connect the substrate 400 to a fluid delivery stick bracket, to a manifold, or both, such as described in Applicant's co-pending application.

As described previously, each of these dowel pin apertures 150a-150h can receive a dowel pin (not shown) that may be used to perform different functions. A first function is to align the cap 495 with the body 401 of the flow substrate 400, and a second is to align the flow substrate with a fluid delivery stick bracket in a manner similar to that described in Applicant's co-pending application. It should be appreciated that in certain installations, only the first of these functions may be performed. For example, depending on the length of the dowel pin used, the dowel pin may protrude through the cap 495 and extend beyond connection attachment surface 115, such that the dowel pins may be used to align the flow substrate with corresponding apertures in the fluid delivery stick bracket or other mounting surface. Where the dowel pins extend beyond the connection attachment surface 115, the locations of the dowel pins may be backwards compatible with existing modular flow substrate systems. Alternatively, the length of the dowel pin may be such that it does not extend beyond the connection attachment surface, but still engages the cap 495 to ensure alignment.

Figure 2C:
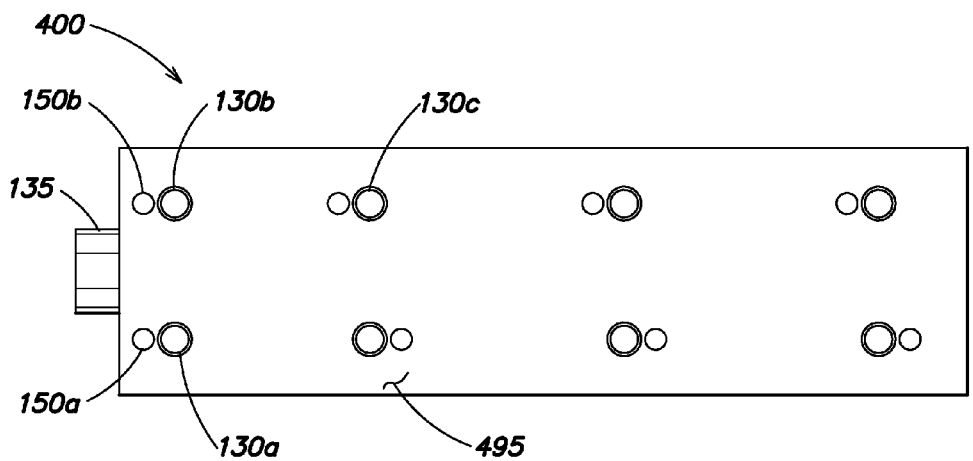
FIG. 2C illustrates a view of the flow substrate of FIGS. 2A and 2B from below.
Figure 2D:
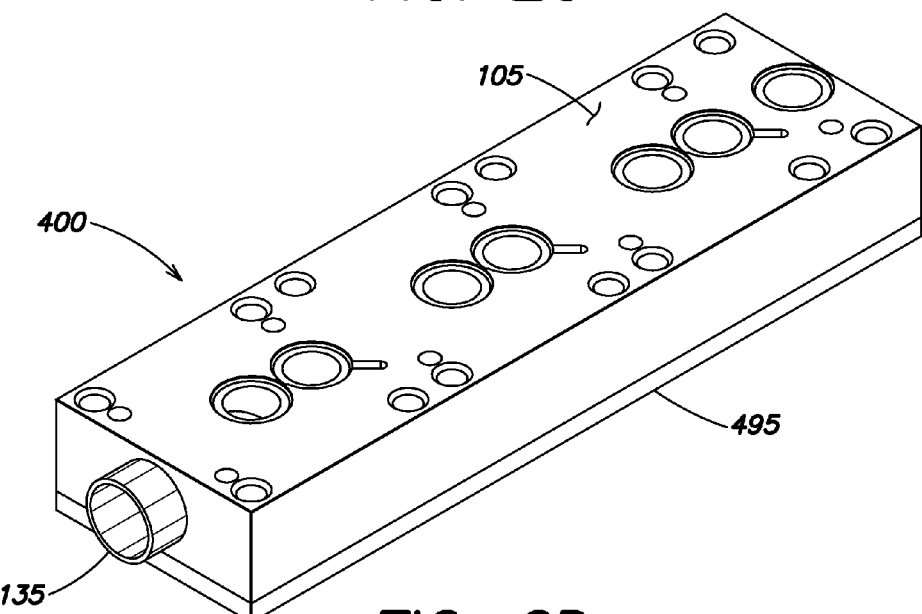
FIG. 2D is an elevational view of the flow substrate of FIGS. 2A-C.

FIG. 2C illustrates a view of the flow substrate 400 from below in which a plurality of flow substrate mounting apertures 130 are visible. The plurality of flow substrate mounting apertures 130 are formed in the cap 495 and extend through the cap 195 and into the body 401 of the flow substrate (shown more clearly in FIG. 2G). Within the flow substrate body, the flow substrate mounting apertures 130 (130a, 130b in FIG. 2G) are internally threaded to receive a fastener 421 (FIG. 2H) to mount the flow substrate 400 to a mounting surface, such as a fluid delivery stick bracket, from below. The fasteners 421 are also used to compress a deformable gasket 455, such an elastomeric o-ring to form a seal around each respective fluid pathway 175b, 175c, and 175d, as described further below. As can be seen in the figures, component conduit ports 120 and fluid pathways 175 can again be machined or molded in a cost-effective manner.

Figure 2E:
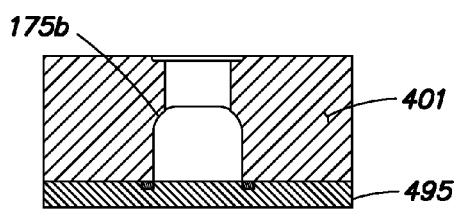
FIG. 2E is a cross-sectional view of the flow substrate of FIG. 2B taken along line B-B in FIG. 2B.
Figure 2F:
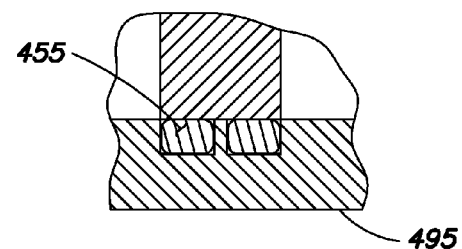
FIG. 2F is an exploded view of a portion of the flow substrate depicted in FIG. 2B.
Figure 2G:
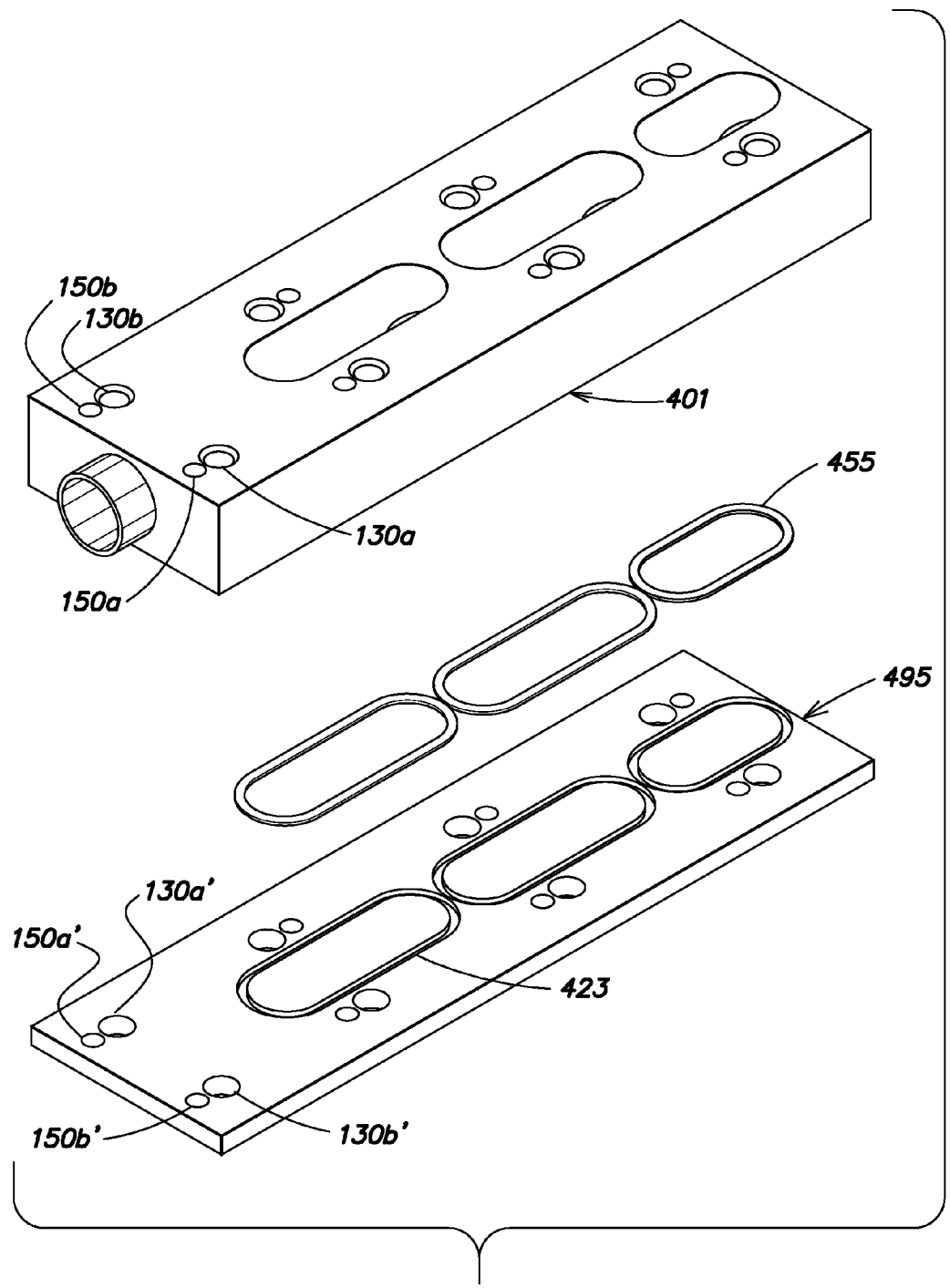
FIG. 2G illustrates various elevational views of the flow substrate of FIGS. 2A-F from below prior to assembly of the cap.

FIGS. 2D-H illustrate various details of the cap 495 in accordance with an aspect of the present invention. As shown in FIGS. 2B and 2E, the thickness of the cap 495 is considerably thicker than that of the first embodiment (e.g., 0.13 inches (3.3 mm) versus 0.02 inches (0.5 mm)) making it somewhat less effective at transferring heat, or cooling to the fluid flowing in the flow substrate, particularly where the cap 495 and body 401 of the flow substrate 400 are formed from relatively non-conductive materials, such as plastic, and where heating (or cooling) is provided to the exposed surface 115 from below. However, the thickness of the cap 495 permits the cap 495 to be sufficiently rigid so as to permit it to act as its own mounting surface, and permits grooves 423 to be formed therein that are sufficiently deep so as to retain an elastomeric seal 455. In further contrast to the cap 195 of the first embodiment, and as shown most clearly in FIG. 2G, the grooves 423 are machined in the surface of the cap 495 that is to be placed in registration with the body 401 of the flow substrate (i.e., the unexposed surface of the cap 495 when placed in registration with the body 401 of the substrate 400, rather than the exposed surface 115 that would be placed in registration with a fluid delivery stick bracket or other mounting surface as in the first embodiment). The grooves 423 are dimensioned so as to retain the elastomeric seal 455 in place during assembly of the cap 495 to the body 401 of the flow substrate 400 without the use of additional seal retainers. During assembly and with specific reference to FIG. 2G, the elastomeric seals 455 would be positioned in the grooves 423 defined in a top surface of the cap 495, with the top surface of the cap 495 being placed in registration with the body 401 of the substrate so that dowel pin aperture 150a' in the cap 495 is aligned with dowel pin aperture 150a in the body 401, dowel pin aperture 150b' in the cap is aligned with dowel pin aperture 150b in the body 401, and substrate mounting apertures 130a' and 130b' in the cap 495 are aligned with substrate mounting apertures 130a and 130b in the body 401, respectively. Although the grooves 423 of this embodiment are described as being machined in the surface of the cap, it should be appreciated that may be formed by other processes, such as by molding.

Figure 2H:
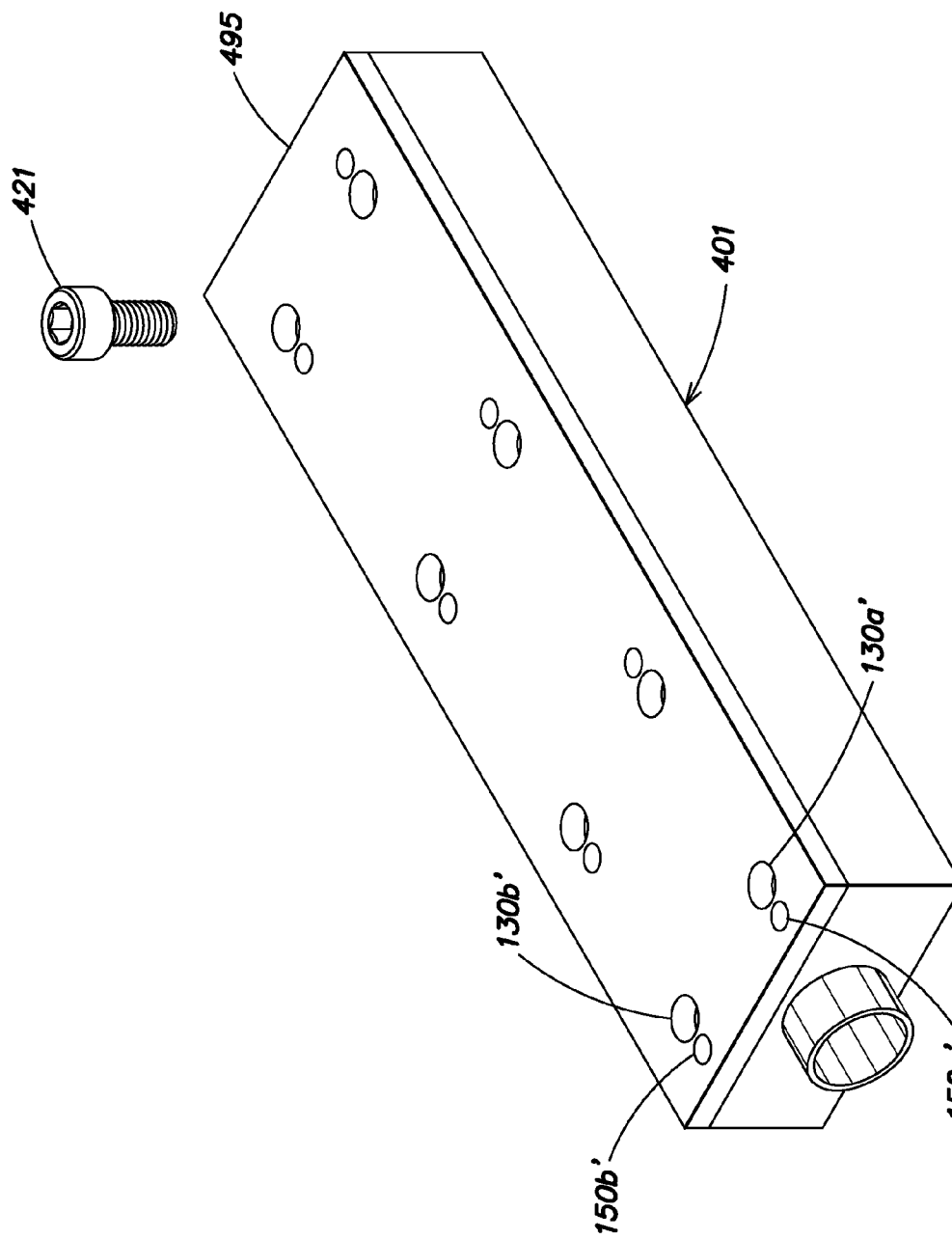
FIG. 2H illustrates an elevational view of the flow substrate of FIGS. 2A-G from below after assembly of the cap.

As can be seen in FIG. 2H, a plurality of fasteners 421 are used to secure the cap 495 to the body 401 of the flow substrate 400. These fasteners 421 may serve two purposes: to mount the flow substrate 400 to a fluid delivery stick bracket from below; and to compress the elastomeric seals 455 and ensure a fluid tight seal around the periphery of the fluid pathways 175b-d. In use, the elastomeric seals 455 would typically be placed in position in the grooves 423 of the cap 495. The cap would then be aligned with the body 401 of the flow substrate 400, aided by the dowel pins inserted in dowel pin apertures 150, where the dowel pins extending through dowel pin apertures 150a', 150b', etc. of the cap 495 act to secure the cap 495 and elastomeric seals 455 in place with the substrate body 401 of the flow substrate 400, thereby forming a single unit. The flow substrate 400 would then be placed in the desired position on the fluid delivery stick bracket or other mounting surface, and the fasteners 421 inserted from below the bracket or other mounting surface. Tightening of the fasteners 421 secures the flow substrate to the mounting surface, and compresses the elastomeric seals 455 so that a fluid tight seal is formed around the periphery of the fluid pathway, and the cap 495 is in registration with the body 401 of the flow substrate 400.

It should be appreciated that because the cap 495 is not welded to the body 401 of the flow substrate 400, the cap 495, and the associated elastomeric seals 455 may later be removed with a minimal amount of effort. Thus, for example, where it is desired to clean or otherwise service a fluid pathway 175b, 175c, or 175d, the cap 495 may be easily removed to expose and/or clean the fluid pathways, to replace one or more of the elastomeric seals 455, etc.

It should be appreciated that although only four fluid pathways are illustrated in the figures associated with this second embodiment, the ease and low cost of manufacturing embodiments of the present invention readily permits any number of fluid pathways and component ports to be defined in the flow substrate. In this regard, all of the fluid pathways and component connection ports for an entire fluid delivery stick or chemical or biological delivery system may be formed (by machining, by molding, or a combination of molding and machining) in a single flow substrate.

Although the embodiment depicted in FIGS. 2A-H may not be as effective at transferring thermal energy (heating or cooling) to the fluid flowing in the flow substrate when heated or cooled from below, it should be appreciated that this second embodiment may be modified for such use. For example, the thickness of the cap 495 may be increased so as to permit the formation of longitudinal heater apertures and the insertion of one or more cartridge type heaters therein that directly heat the cap 495, and thus the fluid flowing in the fluid pathways 175. Such a modification may be used even where the body 401 of the flow substrate is formed from a non-conductive material, such as plastic. For example, to further improve thermal conductivity, the cap 495 may be formed from a thermally conductive material, such as aluminum, while the body 401 of the flow substrate is formed from a different material, e.g., plastic.

Although not specifically illustrated, it should be appreciated that other aspects described in Applicant's co-pending application may be adapted for use with the flow substrate described herein. For example, in addition to fluid pathways oriented in a longitudinal direction, the flow substrate may include a manifold fluid pathway oriented in a transverse direction. In such an embodiment, a tube stub connection similar to the tube stub connection 135 could extend from a lateral side surface of the body 101 (401) of the flow substrate, with the manifold fluid pathway being formed in a manner similar to that described with respect to fluid pathway 175a.

Although embodiments of the present invention have been described primarily with respect to the use of fluid handling components having two ports, it should be appreciated that embodiment of Applicant's invention could be modified for use with a three-port component, such as a 3-port valve. However, because such fluid handling components are less common, and typically more expensive, two-port fluid handling components are generally preferred.

The embodiments of FIGS. 1 and 2 described above are directed to flow substrates in which a plurality of fluid pathways formed within the substrate body are sealed by a common or integrated cap that is attached to the bottom surface of the substrate body. The embodiment of FIGS. 1A-J uses an integrated cap that is welded to the bottom surface of the flow substrate around each of the fluid pathways to seal each of the fluid pathways, while the embodiment of FIGS. 2A-H use an integrated cap that, when compressed against the bottom surface of the substrate body, compresses a plurality of elastomeric seals disposed around each of the fluid pathways to seal each of the fluid pathways. In accordance with another aspect of Applicant's invention, rather than using an integrated cap to seal each of a plurality of fluid pathways in a flow substrate as shown in FIGS. 1 and 2, a plurality of individual caps may alternatively be used. Embodiments of Applicant's invention that use a plurality of individual caps are now described with respect to FIGS. 3-12.

Figure 3A:
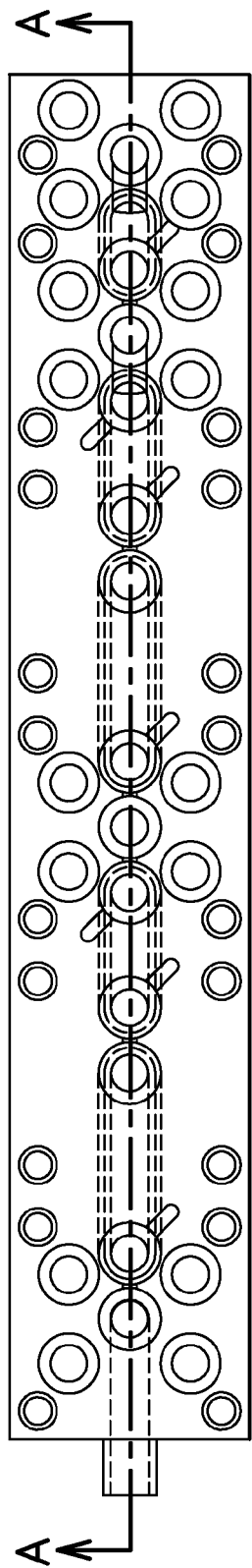
FIG. 3A is a plan view of a third embodiment of a flow substrate in accordance with the present invention.
Figure 3B:
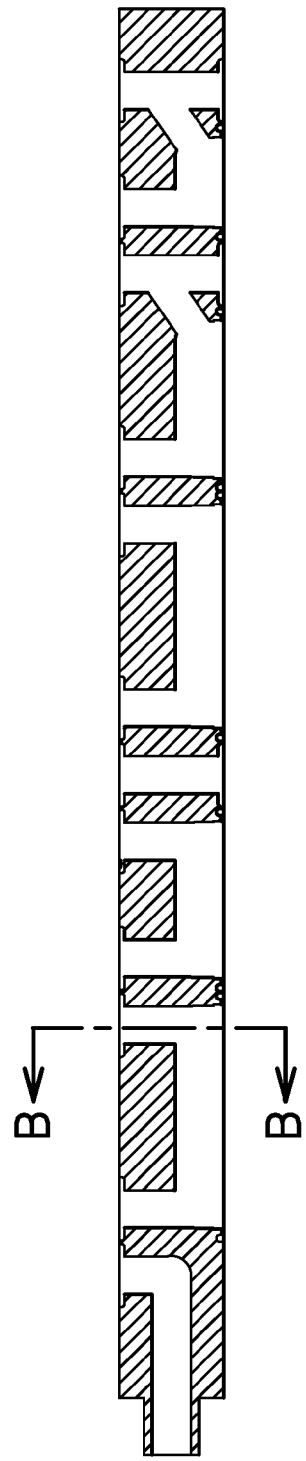
FIG. 3B is a cross-sectional view of the flow substrate of FIG. 3A taken along line A-A in FIG. 3A.
Figure 3C:
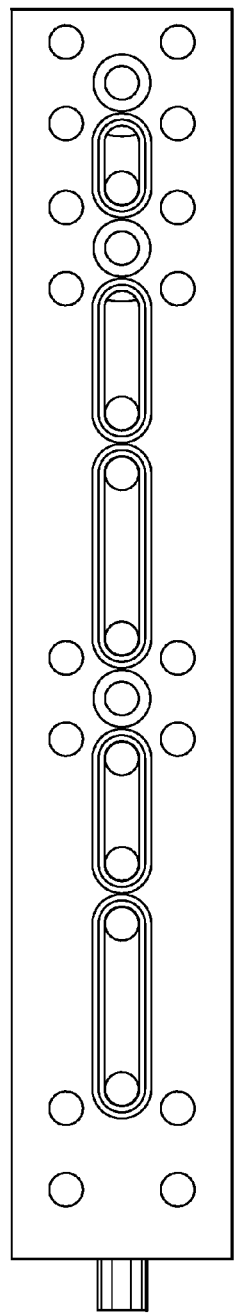
FIG. 3C illustrates a view of the flow substrate of FIGS. 3A and 3B from below.

FIGS. 3A-E are directed to a flow substrate that includes a plurality of associated caps, with each cap being associated with a respective fluid pathway formed in the body of the flow substrate. The caps may be similar in structure to the cap 595 shown in FIG. 5, and are recessed within the body of the substrate and then seam welded in place. The caps may be formed, for example, by stamping or by machining a piece of metal, for example, stainless steel. FIGS. 3A-C illustrate that in addition to being able to accommodate fluid handling components with two ports, certain embodiments of the present invention may be modified to accommodate fluid handling components having three ports.

Figure 3D:
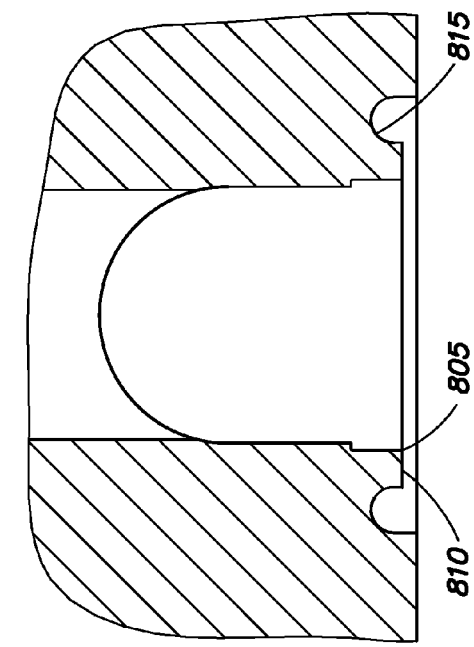
FIG. 3D is an exploded cross-sectional view of a portion of the flow substrate of FIGS. 3A-C taken along line B-B in FIG. 3B.
Figure 3E:
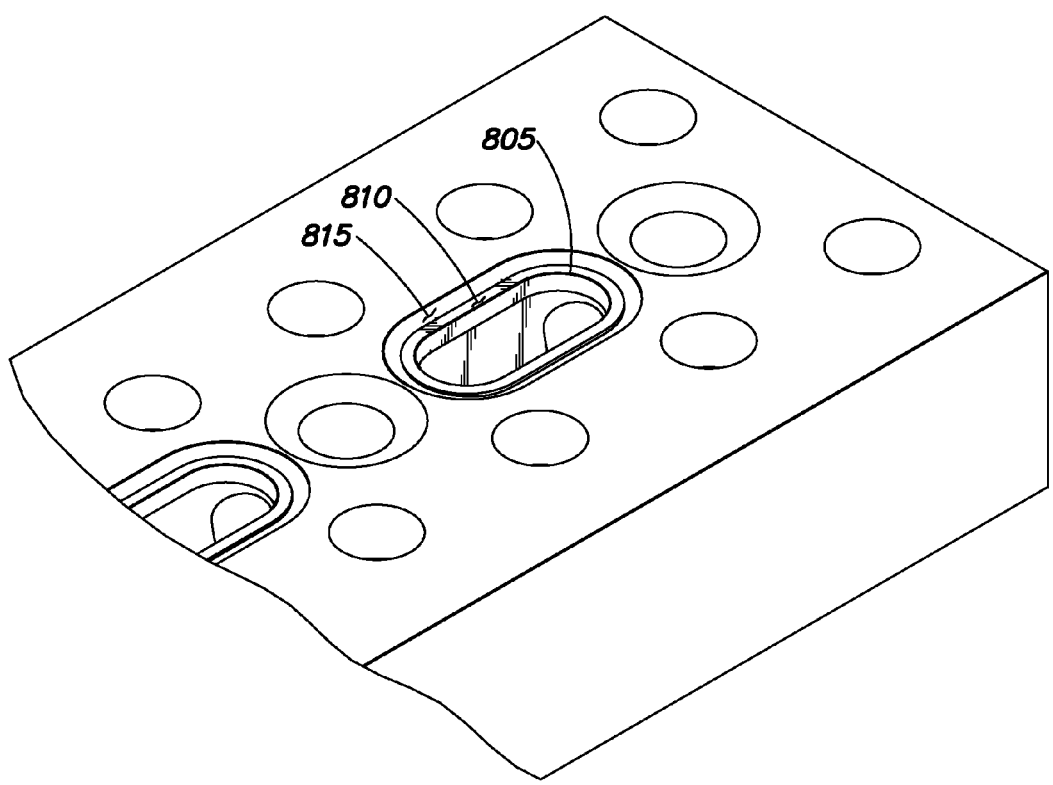
FIG. 3E is an exploded elevational view of a portion of the flow substrate of FIGS. 3A-D from below showing a first weld preparation.

As can best be seen in FIGS. 3D and 3E, each of the fluid pathways is surrounded by a weld formation (also called a weld preparation) that includes a weld edge 805, a stress relief wall 810 and a stress relief groove 815. The stress relief groove 815 acts to prevent any bowing, twisting, or other distortion that might occur during seam welding of the cap 595 to the body of the flow substrate along the weld edge 805, and the exposed surface of the weld cap 595 fits within the body of the flow substrate. Although the welding of the cap to the body of the substrate will typically leave a small bump at the weld location, no additional surface preparation is required to remove this bump because it does not extend beyond the bottom surface of the body of the flow substrate and may be left in place.

FIGS. 4A-G illustrate an alternative design of a flow substrate in accordance with the present invention that also includes a fluid pathway that is sealed by a corresponding individual cap. It should be appreciated that although FIGS. 4A-G illustrate only a single fluid pathway interconnecting two component conduit ports formed in a component attachment surface of the substrate, the substrate body may include a plurality of fluid pathways similar to those shown in FIGS. 3A-E, as FIGS. 4A-G illustrated herein are primarily used to detail the structure of the weld formation used in this particular embodiment. The cap that is used in this embodiment may be formed from a piece or sheet of metal, such as by stamping or machining, as illustrated in FIG. 5.

Figure 4A:
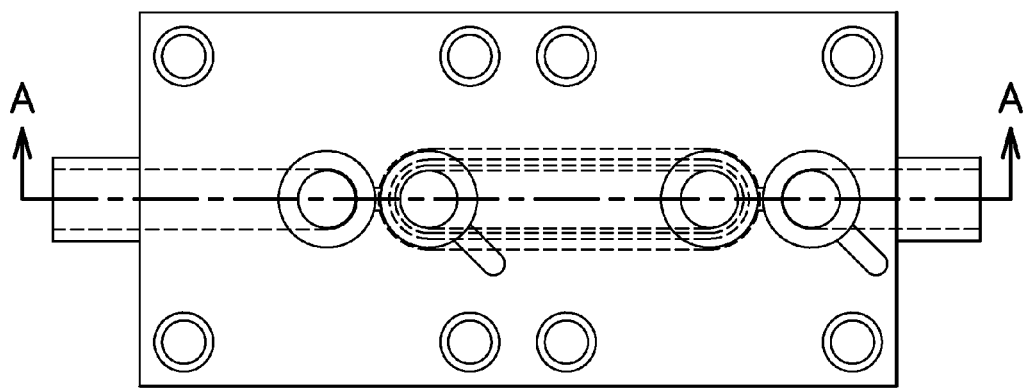
FIG. 4A is a plan view of fourth embodiment of a flow substrate in accordance with the present invention.
Figure 4B:
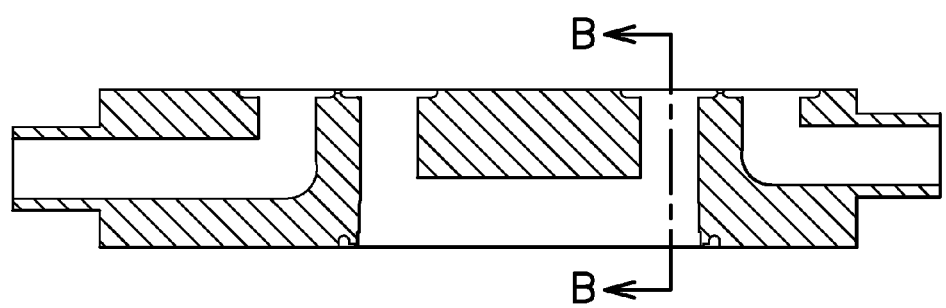
FIG. 4B is a cross-sectional view of the flow substrate of FIG. 4A taken along line A-A in FIG. 4A.
Figure 4C:
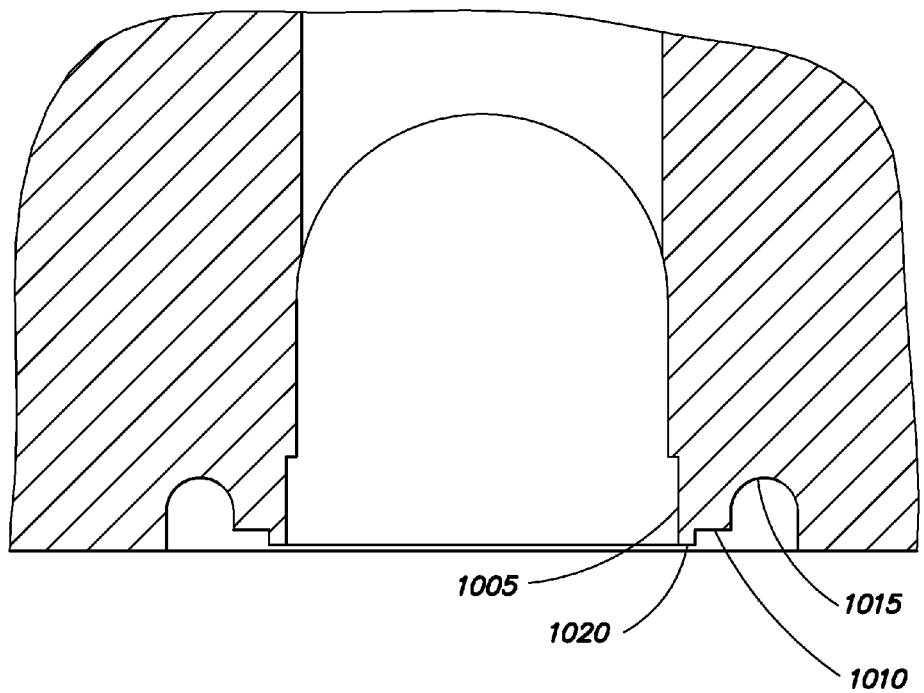
FIG. 4C is an exploded cross-sectional view of a portion of the flow substrate of FIGS. 4A-B taken along line B-B in FIG. 4B.
Figure 4D:
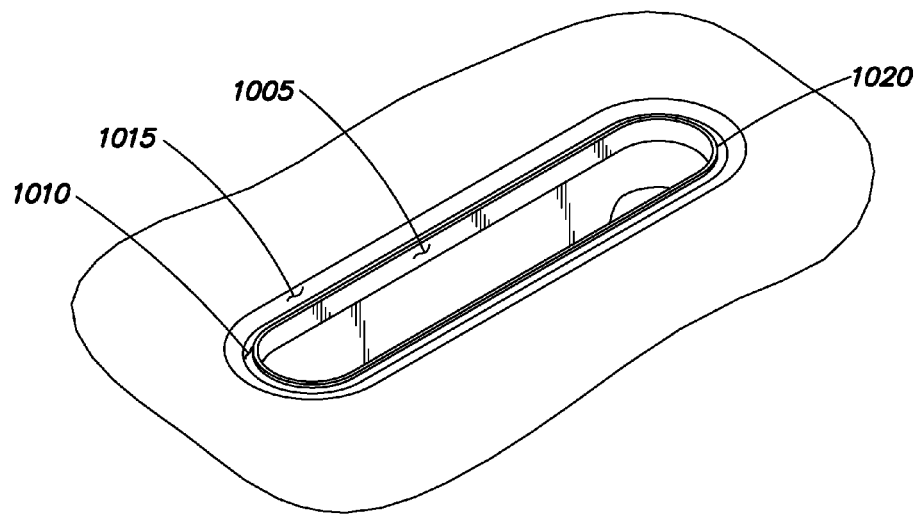
FIG. 4D is an exploded elevational view of a portion of the flow substrate of FIGS. 4A-C from below showing a second weld preparation.

As best illustrated in FIG. 4C, the weld formation includes a weld edge 1005, a stress relief wall 1010 and a stress relief groove 1015, each performing a function similar to that described above with respect to FIGS. 3A-E. However, in contrast to the embodiment of FIGS. 3A-E, the embodiment depicted in FIGS. 4A-G also includes a swaged lip 1020. During manufacture, after placing a respective cap 595 (FIG. 5) in each of the fluid pathways to be sealed, a mechanical force would be applied to the swaged lip 1020 surrounding each fluid pathway, for example, using a die or jig built for this purpose. The mechanical force applied to the die or jig pushes or folds (i.e., swages) the lip inward toward the weld edge to capture and retain the respective cap 595 within the body of the flow substrate. The substrate with its associated retained cap(s) may then be manipulated as a single unit. Each respective cap may then be seam welded along the folded swaged lip and weld edge to form a leak tight seal. As in the embodiment of FIGS. 3A-E, no additional surface preparation or machining is required to remove any weld bump that might be formed along the weld edge, because it does not extend beyond the bottom surface of the substrate body. As in the previous embodiment of FIGS. 3A-E, the stress relief groove acts to prevent any bowing, twisting, or other distortion that might occur during seam welding of the cap 595 to the body of the flow substrate along the weld edge 1005

Figure 5:
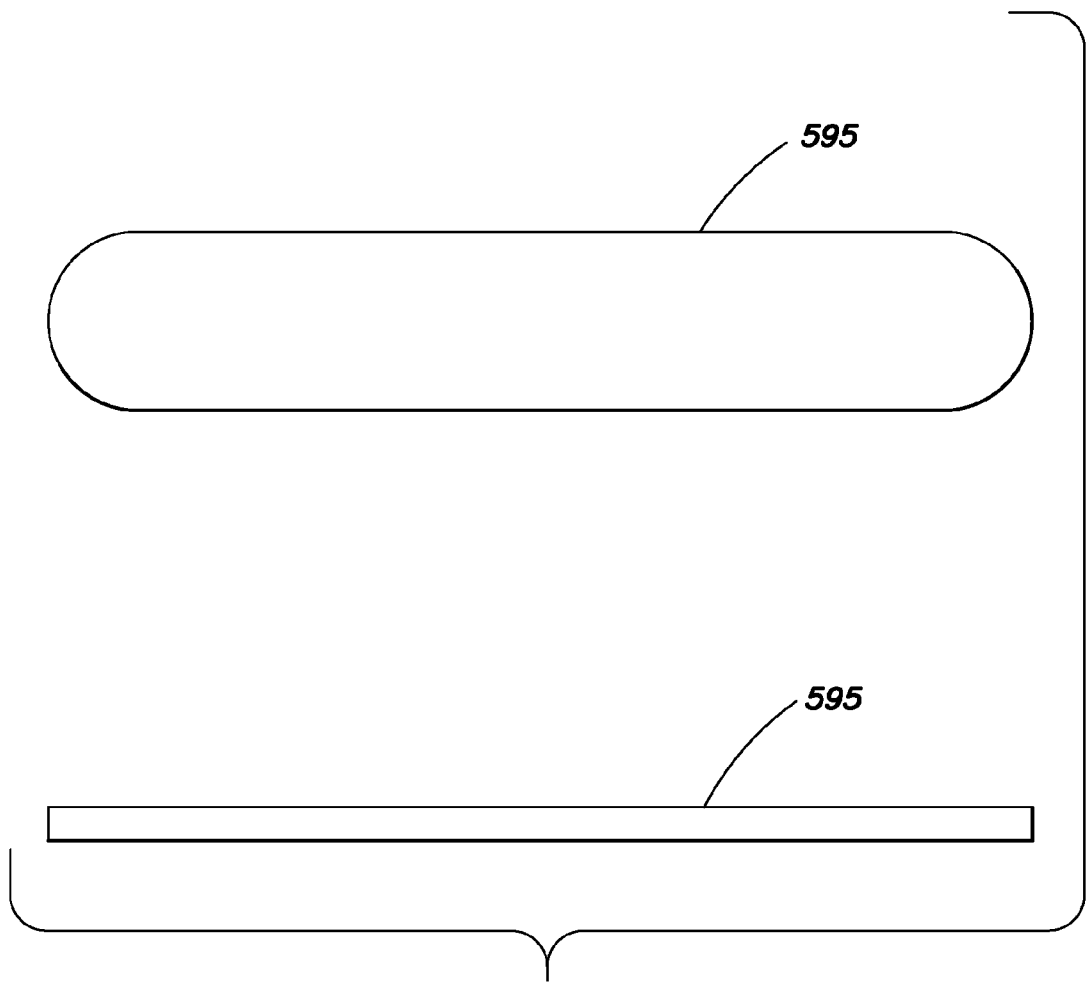
FIG. 5 illustrates various views of a weld cap for use with the flow substrates of FIGS. 3-4 in accordance with an aspect of the present invention.

FIG. 5 illustrates a cap 595 that may be used with the embodiments of FIGS. 3-4. Advantageously, the cap 595 may be machined or stamped from a sheet of metal at very low cost. The thickness of the cap 595 in one embodiment of the present invention is approximately 0.035 inches (0.9 mm) thick, nearly twice the thickness of the integrated weld cap 195, and requires no additional reinforcement even in high pressure applications.

FIGS. 6A-E illustrate yet an alternative design of a flow substrate in accordance with the present invention that includes a fluid pathway sealed by a corresponding individual cap. As in the embodiment of FIGS. 3A-E, it should be appreciated that the substrate body may include a plurality of fluid pathways similar to those shown in FIGS. 3A-E, as FIGS. 6A-E illustrated herein are primarily used to detail the structure of the weld formation used in this particular embodiment. The cap 595 that is used in this embodiment may be the same as that described with respect to FIG. 5 above, and may be formed from a piece or sheet of metal, such as by stamping or machining, as illustrated in FIG. 5.

Figure 6A:
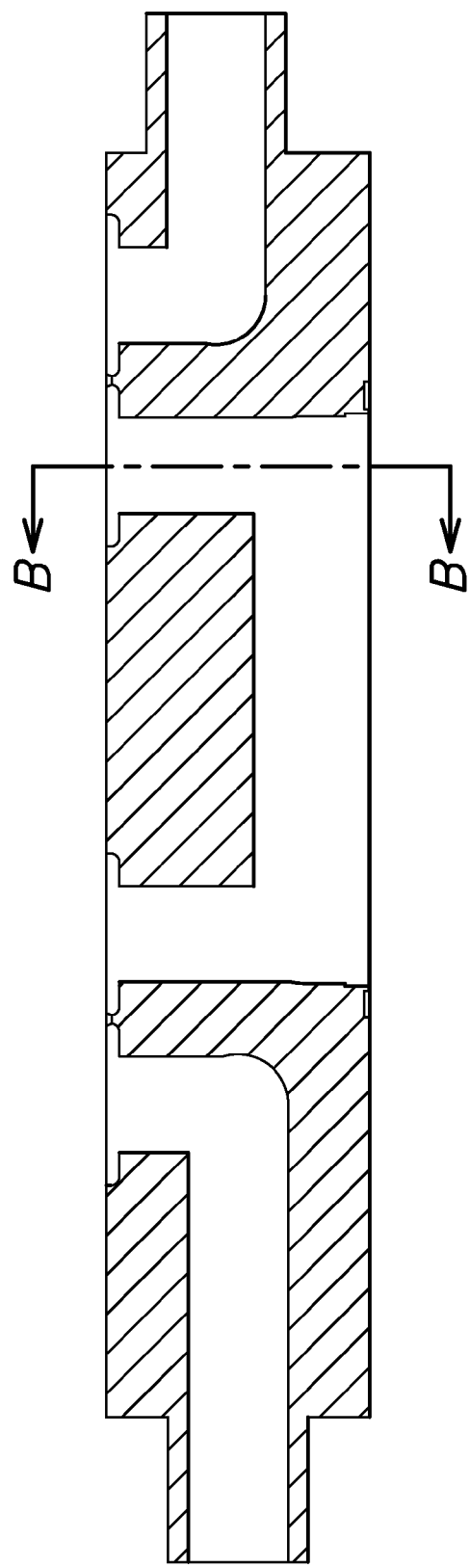
FIG. 6A is a cross-sectional view of a flow substrate in accordance with the fourth embodiment of the present invention that includes a third weld preparation.
Figure 6B:
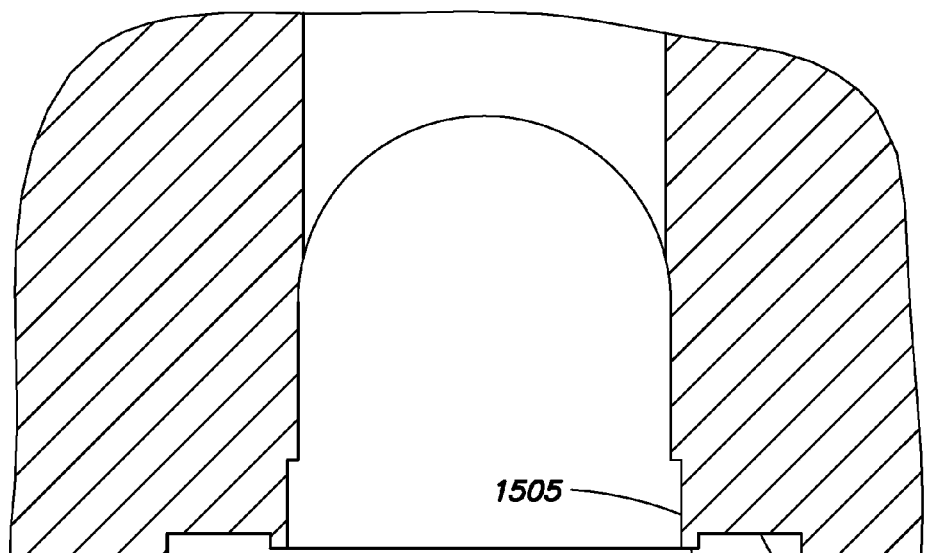
FIG. 6B is an exploded cross-sectional view of a portion of the flow substrate of FIG. 6A taken along line B-B in FIG. 6A.
Figure 6C:
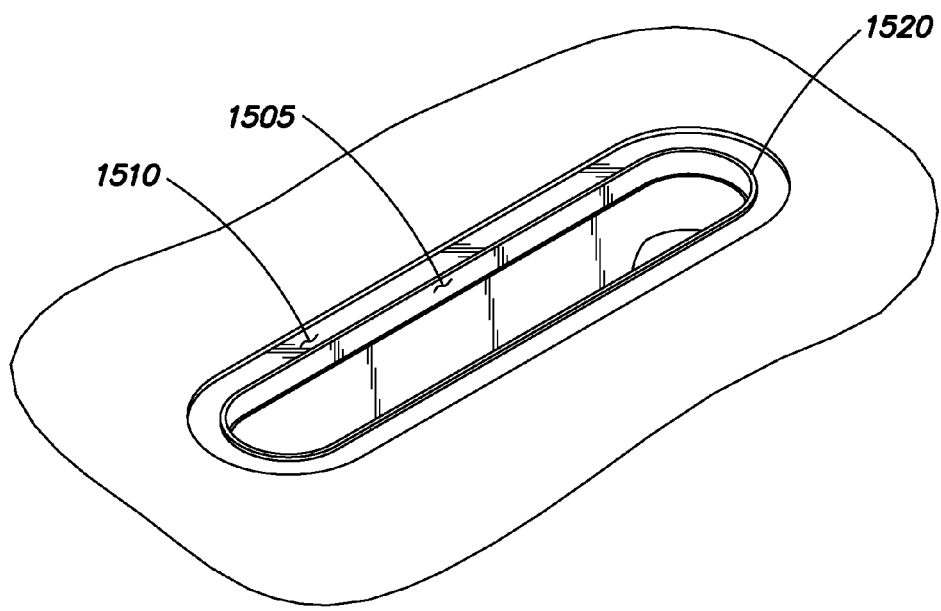
FIG. 6C is an exploded elevational view of a portion of the flow substrate of FIGS. 6A-B from below showing the third weld preparation.
Figure 6D:
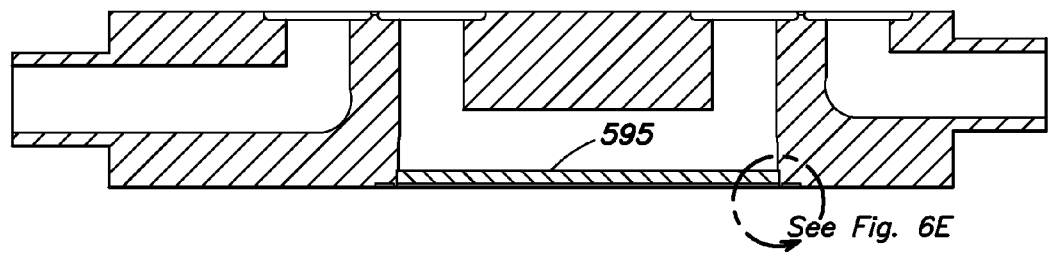
FIG. 6D is a cross-sectional view of the flow substrate of FIGS. 6A-C in which the weld cap is shown in position.
Figure 6E:
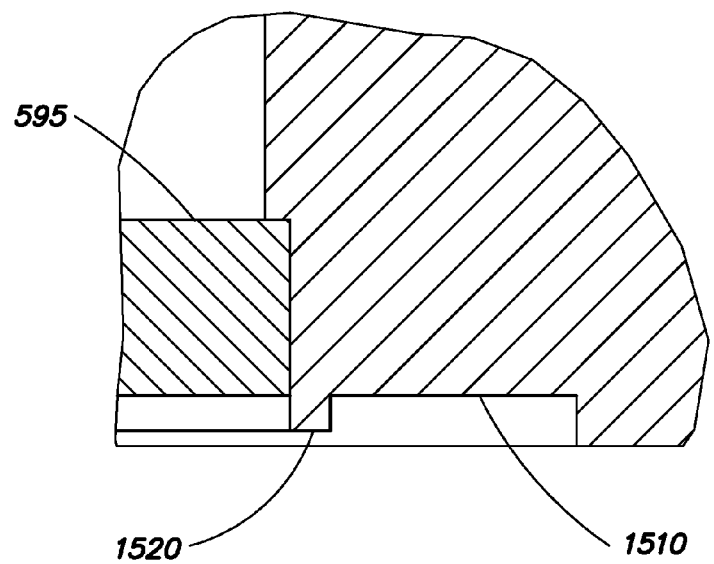
FIG. 6E is an exploded cross-sectional view of a portion of the flow substrate and cap of FIG. 6D.

As best illustrated in FIG. 6B, the weld formation of this embodiment is substantially similar to that described above with respect to FIGS. 4A-G, and includes a weld edge 1505, a recessed flat bottom 1510, and a swaged lip 1520. As in the embodiment of FIGS. 4A-G, a respective cap 595, such as that shown in FIG. 5, may be seam welded to seal each respective fluid pathway. However, the weld formation of this embodiment does not include a stress relief groove as in the embodiment of FIGS. 4A-G. Although the stress relief groove of FIGS. 3A-E and 4A-G helps prevent any deformation of the body of the flow substrate during welding, its presence is not strictly necessary, as seam welding processes generally transfer less heat to the body of the substrate than other types of welding processes, such as stake welding. Accordingly, where cost is a significant concern, the stress relief groove may be omitted as shown with respect to this embodiment. As in the embodiments of FIGS. 3A-E and 4A-G, no additional surface preparation or machining is required to remove any weld bump that might be formed along the weld edge, because it does not extend beyond the bottom surface of the substrate body.

FIGS. 7A-E and 8A-E illustrate alternative embodiments of the present invention that also use individual caps to seal respective fluid pathways formed in the bottom surface of the body of the flow substrate. Each of the embodiments of FIGS. 7A-E and 8A-E use a weld cap (depicted in FIGS. 9A-B) in which a weld formation in the form of a heat penetration groove 2600 is formed around a periphery of the cap 995. It should be appreciated that although FIGS. 7A-E and 8A-E illustrate only a single fluid pathway to be sealed by a respective cap, the substrate body may include a plurality of fluid pathways similar to those shown in FIGS. 3A-E as FIGS. 7A-E and 8A-E are shown herein primarily to detail the structure of the weld formations used in these particular embodiments.

Figure 7A:
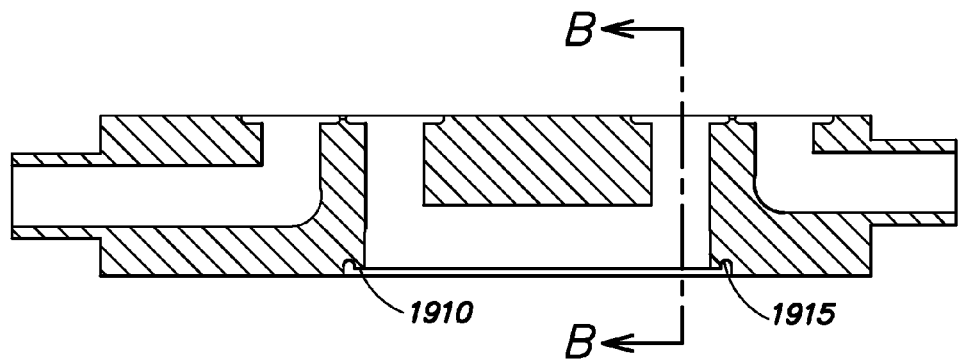
FIG. 7A is a cross-sectional view of a flow substrate in accordance with the fourth embodiment of the present invention that includes a fourth weld preparation.
Figure 7B:
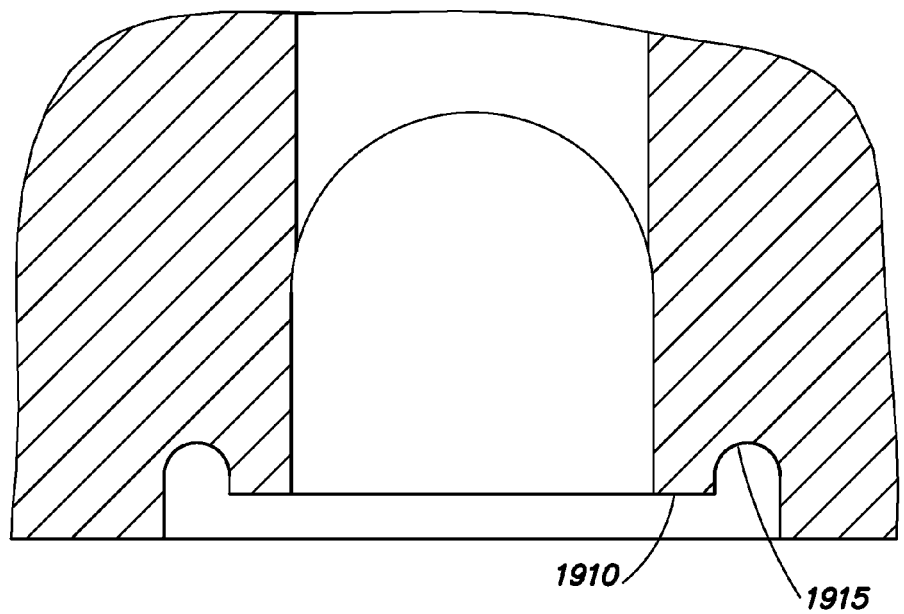
FIG. 7B is an exploded cross-sectional view of a portion of the flow substrate of FIG. 7A taken along line B-B in FIG. 7A.
Figure 7E:
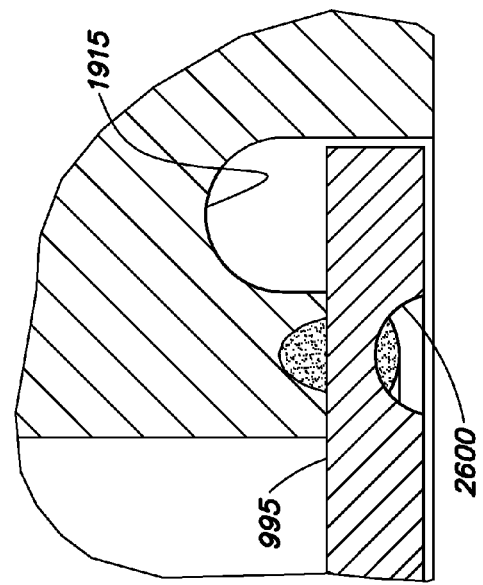
FIG. 7E is an exploded cross-sectional view of a portion of the flow substrate and cap of FIG. 7D.
Figure 7C:
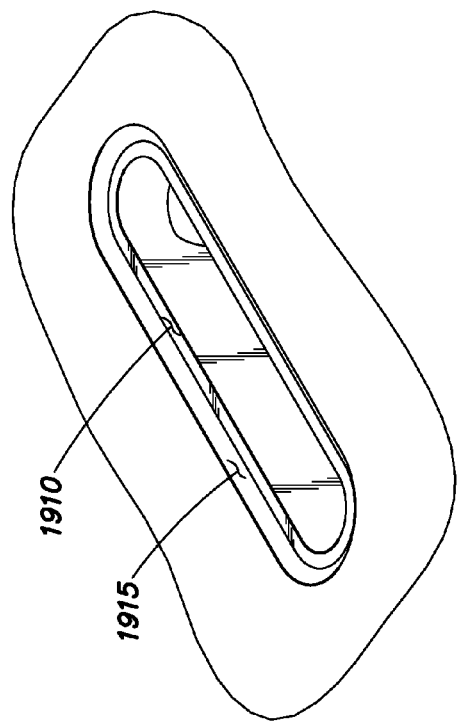
FIG. 7C is an exploded elevational view of a portion of the flow substrate of FIGS. 7A-B from below showing the fourth weld preparation.
Figure 7D:
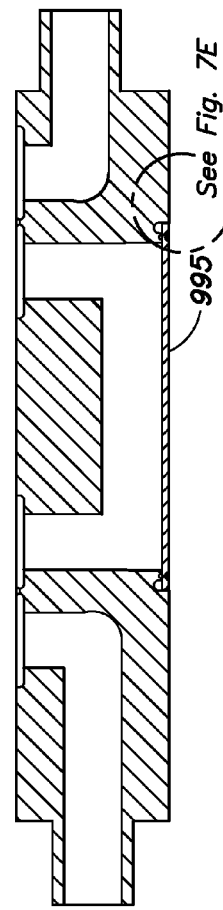
FIG. 7D is a cross-sectional view of the flow substrate of FIGS. 7A-C in which the weld cap is shown in position.
Figure 9A:
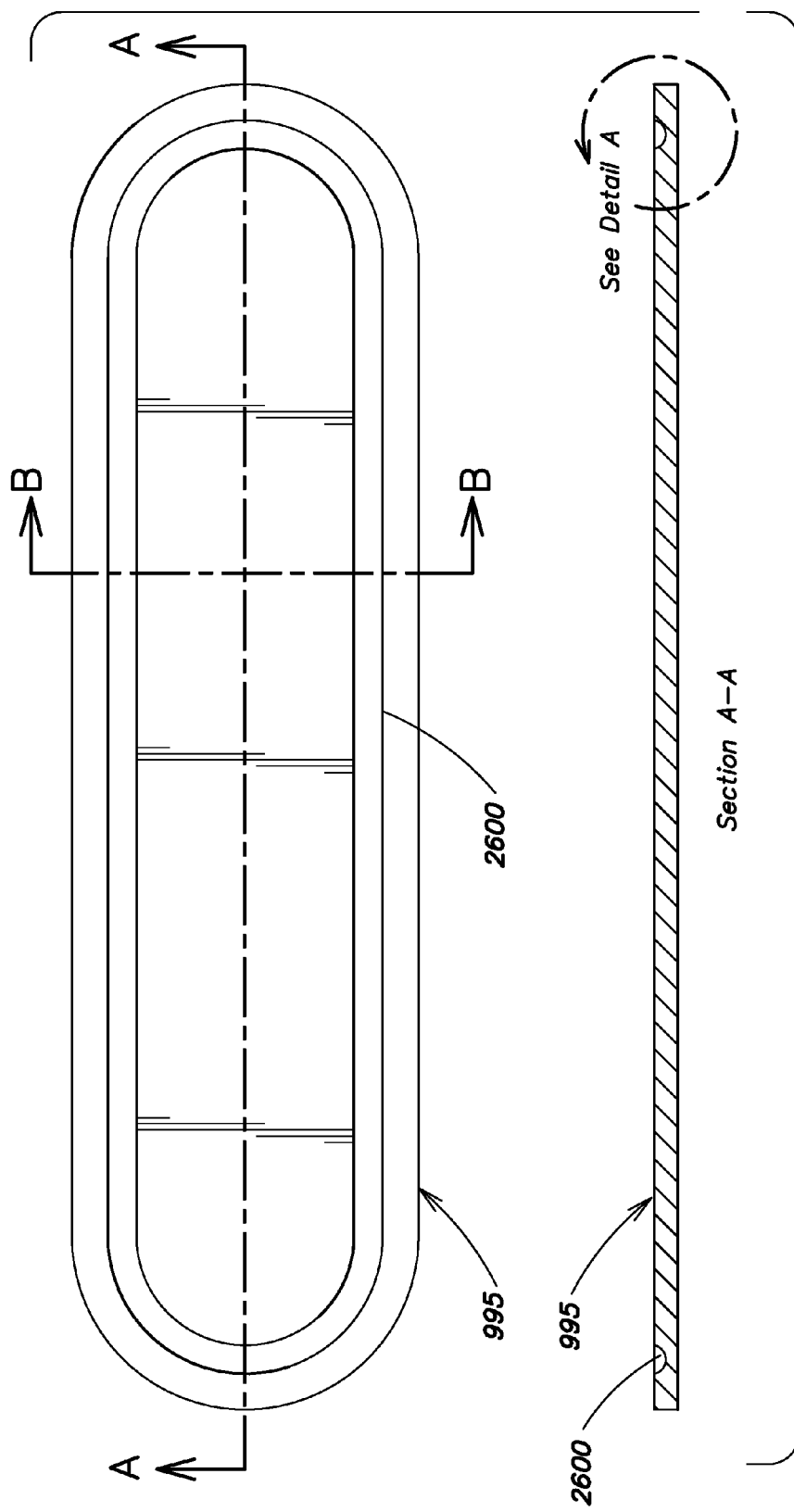

As best illustrated in FIG. 7B, the embodiment of FIGS. 7A-E includes a weld formation formed in the body of the flow substrate that includes a stress relief wall and weld surface 1910 and a stress relief groove 1915. The stress relief groove 1915 again acts to prevent any bowing, twisting, or other distortion that might occur during welding of the cap to the body of the flow substrate. However, in the embodiment of FIGS. 7A-E, the cap is stake welded to the stress relief wall and weld surface 1910 along the heat penetration groove 2600 formed in the cap 995 (FIGS. 9A-B). During manufacture, after placing a respective cap 995 over each of the fluid pathways to be sealed, each respective cap would be staked to the stress relief wall and weld surface 1910. This staking may be performed by welding the cap 995 to the stress relief wall and weld surface 1910 at a number of discrete locations along the periphery of the fluid pathway, or by mechanical force, for example, by using a punch to stake the cap 995 to the stress relief wall and weld surface 1910 at a number of discrete locations. The staking permits the substrate with its associated retained cap(s) to be manipulated as a single unit and prevents movement of the cap 995 during welding. Each respective cap 995 may then be stake welded along the heat penetration groove 2600 to form a continuous weld seal. As described in more detail below with respect to FIGS. 9A-B, the heat penetration groove 2600 permits the cap 995 to be welded to the substrate using less energy, more quickly, and with less deformation to the substrate body than were it not present. FIG. 7E illustrates the manner in which the weld penetrates the body of the substrate.

Figure 8A:
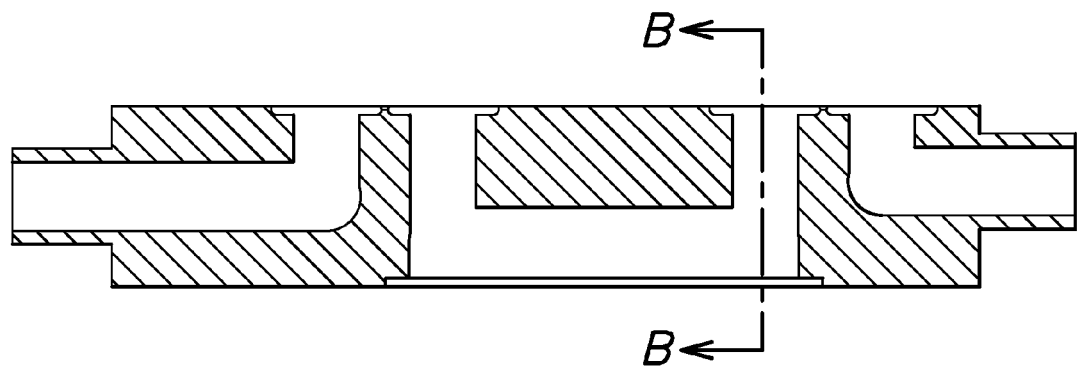
FIG. 8A is a cross-sectional view of a flow substrate in accordance with the fourth embodiment of the present invention that includes a fifth weld preparation.
Figure 8B:
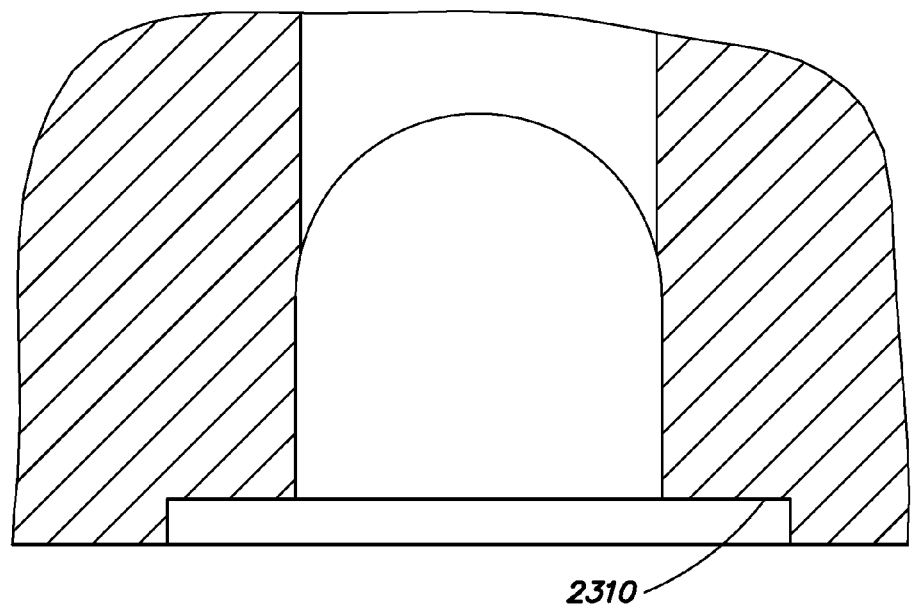
FIG. 8B is an exploded cross-sectional view of a portion of the flow substrate of FIG. 8A taken along line B-B in FIG. 8A.

FIGS. 8A-E illustrate another embodiment of the present invention that uses individual caps to seal respective fluid pathways formed in the bottom surface of the body of the flow substrate. As in the prior embodiment of FIGS. 7A-E, this embodiment uses a weld cap 995 (depicted in FIGS. 9A-B) in which a weld formation in the form of a heat penetration groove 2600 is formed around a periphery of the cap 995. In contrast to the embodiment of FIGS. 7A-E, and as best seen in FIG. 8B, the weld formation of the embodiment of FIGS. 8A-E includes only a flat surface 2310 that is recessed in the bottom surface of the body of the flow substrate that surrounds a periphery of the fluid pathway. During manufacture, after placing a respective cap 995 over each of the fluid pathways to be sealed, each respective cap would be staked to the flat surface 2310 by, for example, by welding the cap to the flat surface at a number of discrete locations along the periphery of the fluid pathway, or by mechanical force, as noted above. As previously noted, the staking permits the substrate with its associated retained cap(s) to be manipulated as a single unit, and prevents movement of the cap during welding. Each respective cap may then be stake welded along the heat penetration groove 2600 to form a continuous weld seal. Because of the heat penetration groove formed around the periphery of the cap 995, the cap may be stake welded to the body of the flow substrate with less energy and less (or no) distortion to the body of the flow substrate than were it not present. FIG. 8E illustrates the manner in which the weld penetrates the body of the substrate.

FIGS. 9A-B illustrate a weld cap that is adapted to be stake welded to the body of a flow substrate. As shown in FIGS. 9A-B, the weld cap 995 includes a heat penetration groove 2600 that surrounds a periphery of the weld cap 995. The heat penetration groove 2600 may be formed by chemical etching, or by machining. The heat penetration groove 2600 reduces the thickness of the weld cap in the location of the groove by approximately 30% to 50%, and in the embodiment shown, by approximately 40%. In the embodiment shown, the thickness of the weld cap 995 is approximately 0.02 inches (0.5 mm) thick, the groove is approximately 0.020 to 0.025 inches wide (0.5 mm to 0.6 mm) at its widest point, and approximately 0.008 to 0.01 inches (0.2 mm to 0.25 mm) deep. Although shown as being semicircular in shape, it should be appreciated that other shapes may alternatively be used. By reducing the thickness of the weld cap, the heat penetration groove 2600 reduces the time and power necessary to form a continuous stake weld with the body of the flow substrate. The heat penetration groove 2600 in the cap also acts as a guide for the person or machine performing the welding. It should be appreciated that the weld cap 995 is similar in design to the integrated weld cap 195 of FIGS. 1A-J, in that the presence of the grooves 123, 2600 act as a guide during welding, and enable fluid pathways to be sealed using less power and time.

FIGS. 10A-G illustrate a flow substrate and associated cap in accordance with another embodiment of the present invention. In contrast to the embodiments of FIGS. 3-9 in which the caps are welded to the body of the flow substrate, the embodiment of FIGS. 10A-G utilizes elastomeric seals to seal the fluid pathway, as in the embodiment of FIGS. 2A-H. In the embodiment of FIGS. 10A-G, the flow substrate, the cap, or both the flow substrate and the cap may be formed from metal, or from non-metallic materials. For example, where it is desired to heat or cool the fluid in the flow substrate, metallic materials may be used, and where ionic contamination is a concern, non-metallic materials may be used.

Figure 10A:
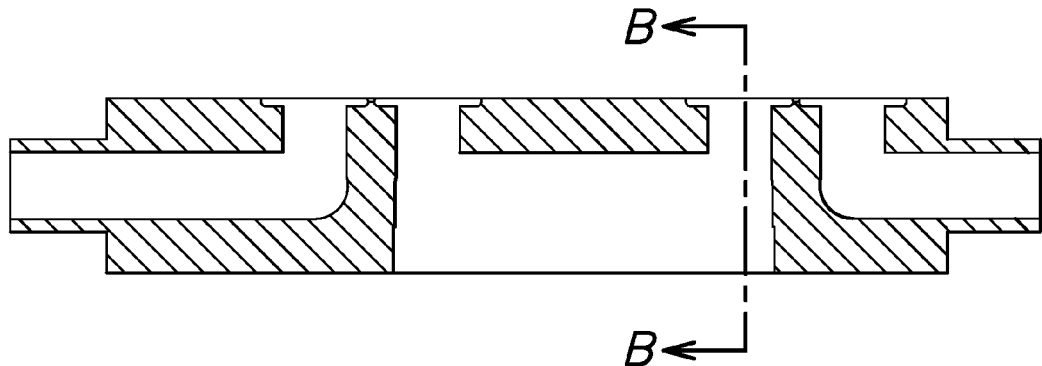
FIG. 10A is a cross-sectional view of a flow substrate in accordance with the fourth embodiment of the present invention that includes a cap and an elastomeric seal.
Figure 10B:
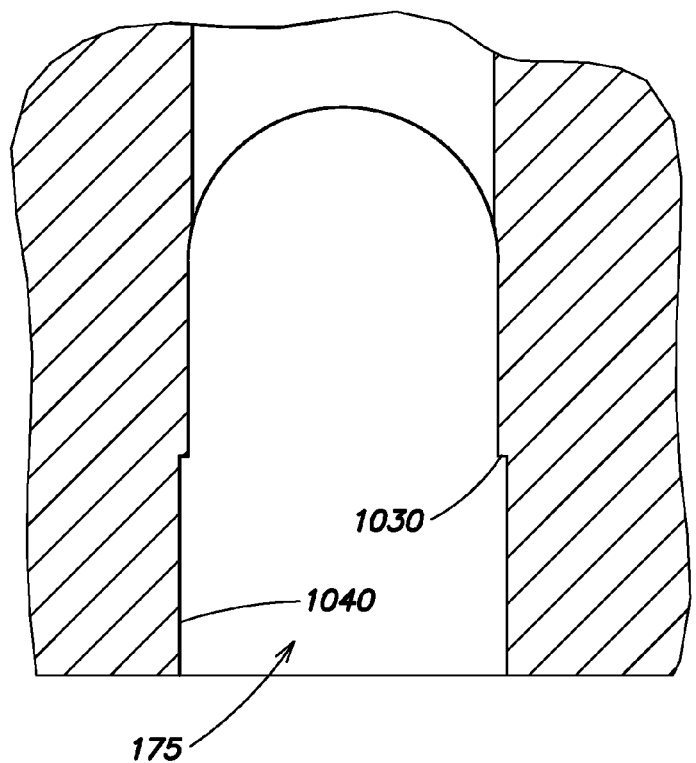
FIG. 10B is an exploded cross-sectional view of a portion of the flow substrate of FIG. 10A taken along line B-B in FIG. 10A.
Figure 10C:
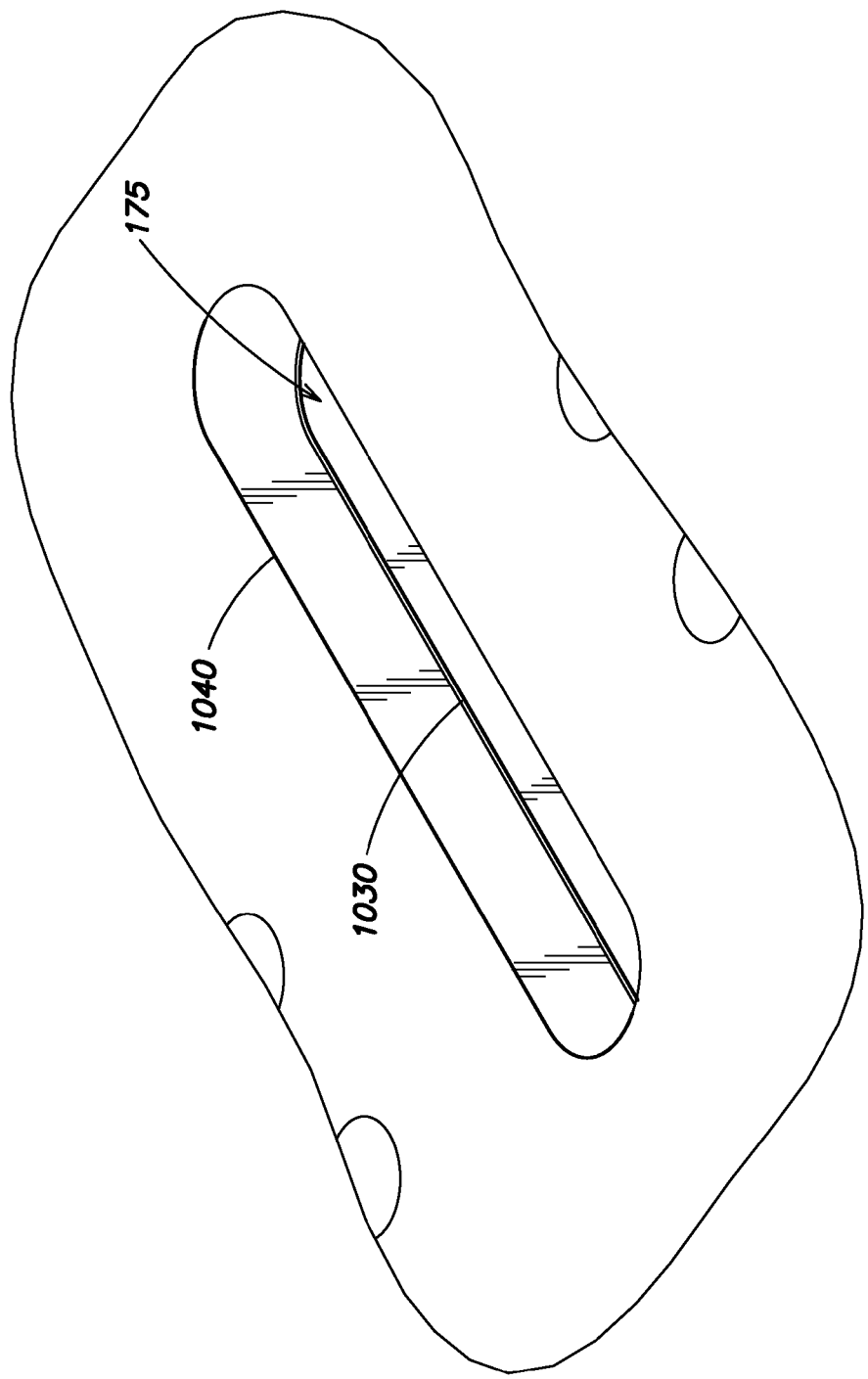
FIG. 10C is an exploded elevational view of a portion of the flow substrate of FIGS. 10A-B from below.
Figure 10D:
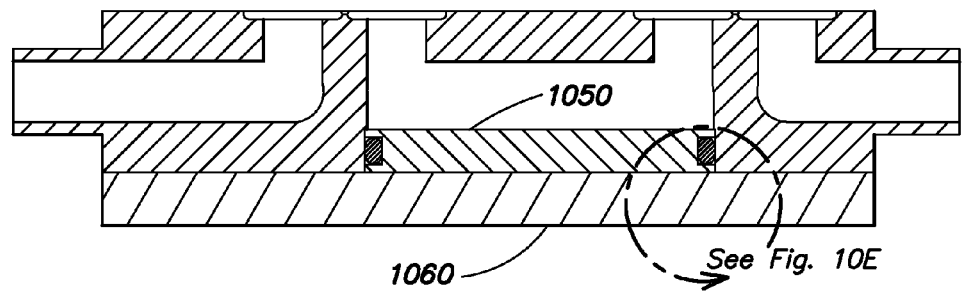
FIG. 10D is a cross-sectional view of the flow substrate of FIGS. 10A-C in which the cap and elastomeric seal are shown in position with a backup plate.
Figure 10E:
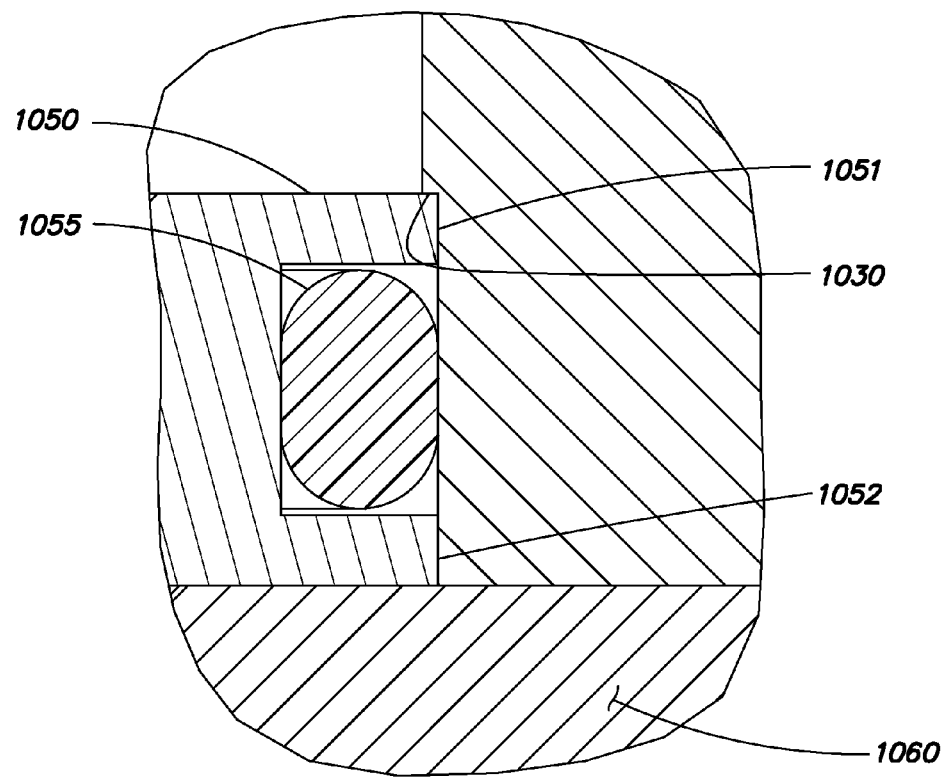
FIG. 10E is an exploded cross-sectional view of a portion of the flow substrate and cap of FIG. 10D.
Figure 10G:
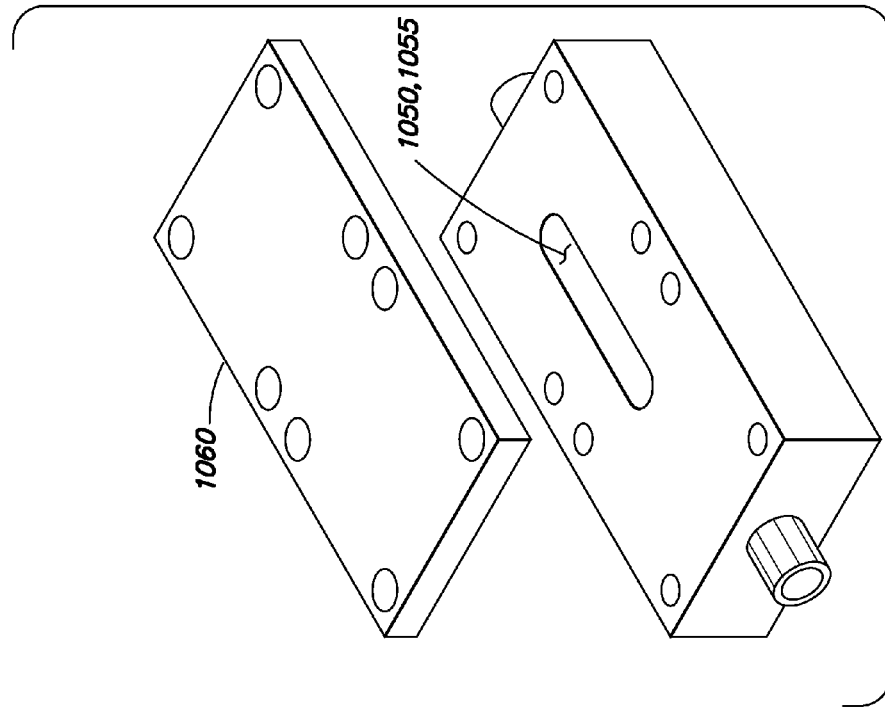
FIG. 10G illustrates an elevational view of the flow substrate, cap, elastomeric seal, and backup plate of FIGS. 10A-F after assembly of the cap and elastomeric seal.
Figure 10F:
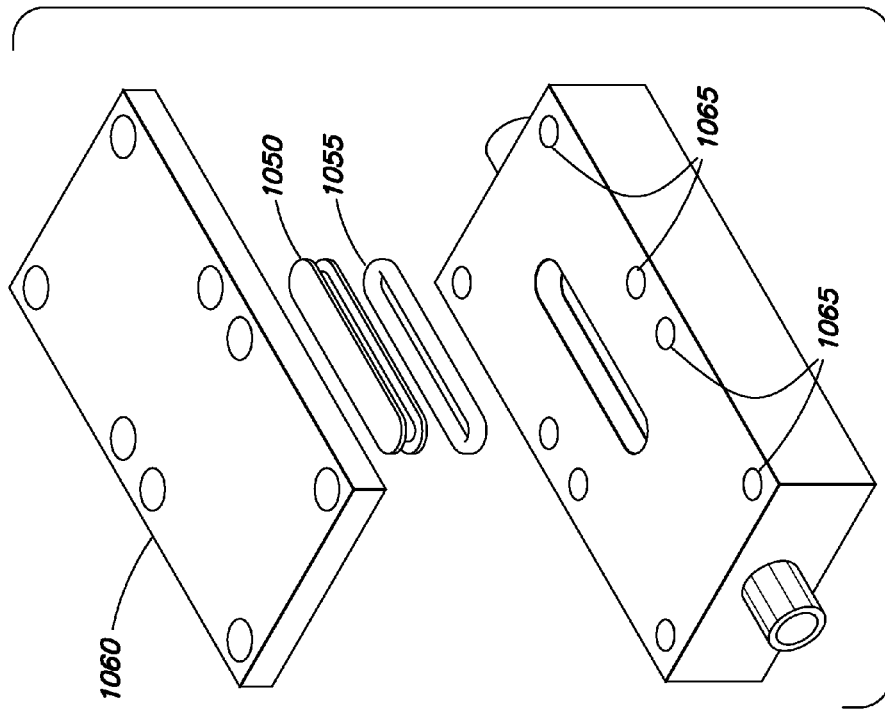
FIG. 10F illustrates an elevational view of the flow substrate, cap, elastomeric seal, and backup plate of FIGS. 10A-E prior to assembly.

As shown in FIG. 10B, the fluid pathway 175 includes a pocket region 1040 that is dimensioned to receive a cap 1050 and associated elastomeric seal 1055 (FIGS. 10D-F) and a positive stop ledge 1030 that is dimensioned to prevent further movement of the cap 1050 and associated elastomeric seal 1055 when compressed in the pocket region 1040 (FIG. 10E).

FIGS. 10D-G illustrate the manner in which a backup plate 1060 may be used to compress the cap 1050 and associated elastomeric seal 1055 within the pocket region of the fluid pathway 175. Threaded fasteners (not shown) that are received in internally threaded flow substrate mounting apertures 1065 compress the backup plate 1060 against the body of the substrate and force the cap 1050 and associated elastomeric seal into sealing engagement within the pocket region 1040. Depending on the application in which this embodiment is used, the flow substrate and the cap may be formed from metal or plastic. The backup plate 1060 may be formed from any suitable material, such as aluminum, where heating or cooling of the fluid in the fluid pathway is desired, or from plastic.

As shown most clearly in FIGS. 10E and F, the cap 1050 includes a pair of shoulders 1051 and 1052 that retain the elastomeric seal 1055 in position about the cap 1050 so that the cap 1050 and associated elastomeric seal 1055 may be inserted as a single unit. The pair of shoulders 1051, 1052 have the same dimensions so that the cap 1050 and its associated elastomeric seal 1055 may be inserted with shoulder 1051 engaging the positive stop ledge 1030, or with the shoulder 1052 engaging the positive stop ledge 1030.

Figure 11A:
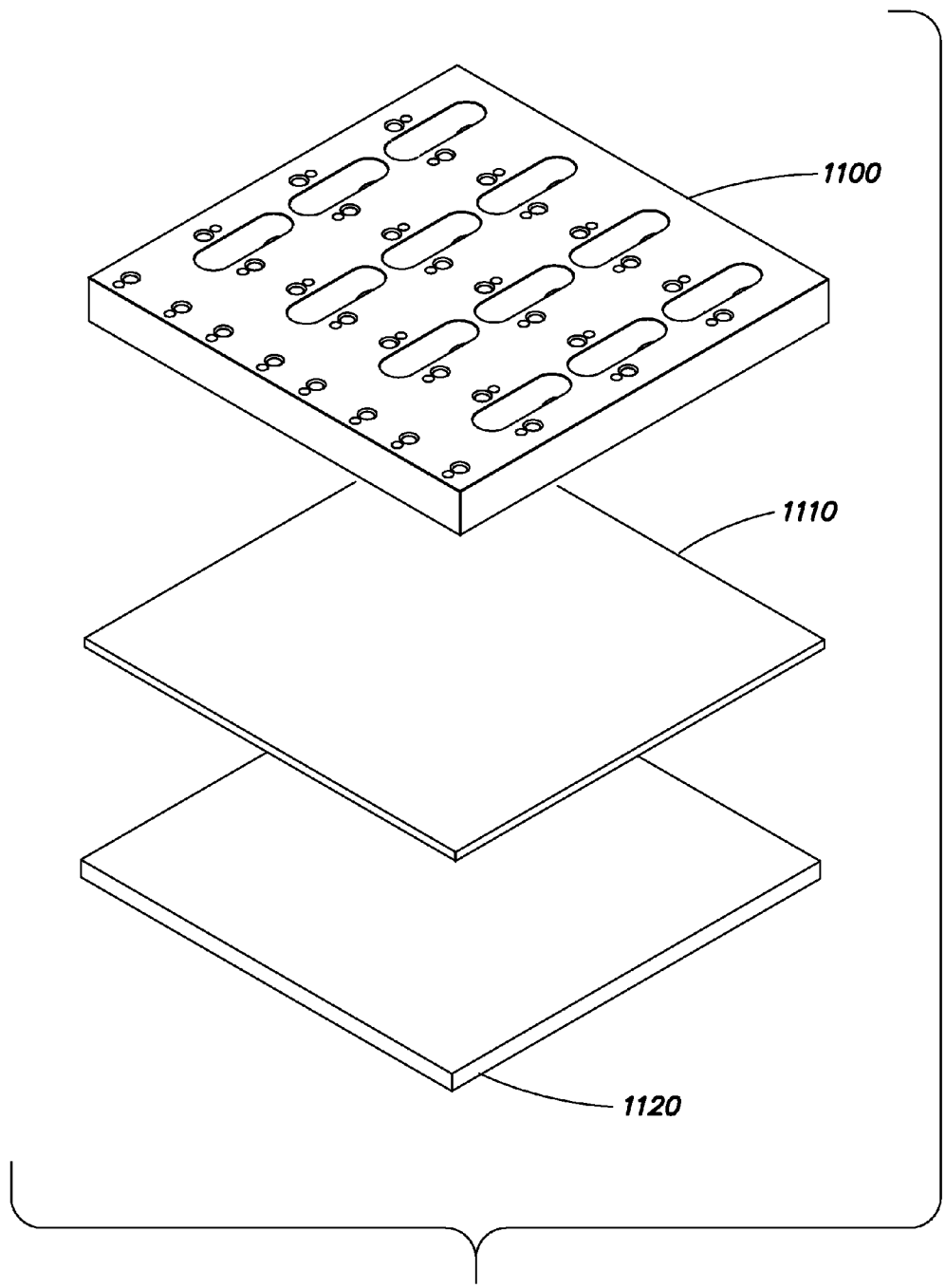
FIG. 11A illustrates the manner in which a single fluid substrate may be used to implement all or a portion of a heated gas panel in accordance with one embodiment of the present invention.
Figure 11B:
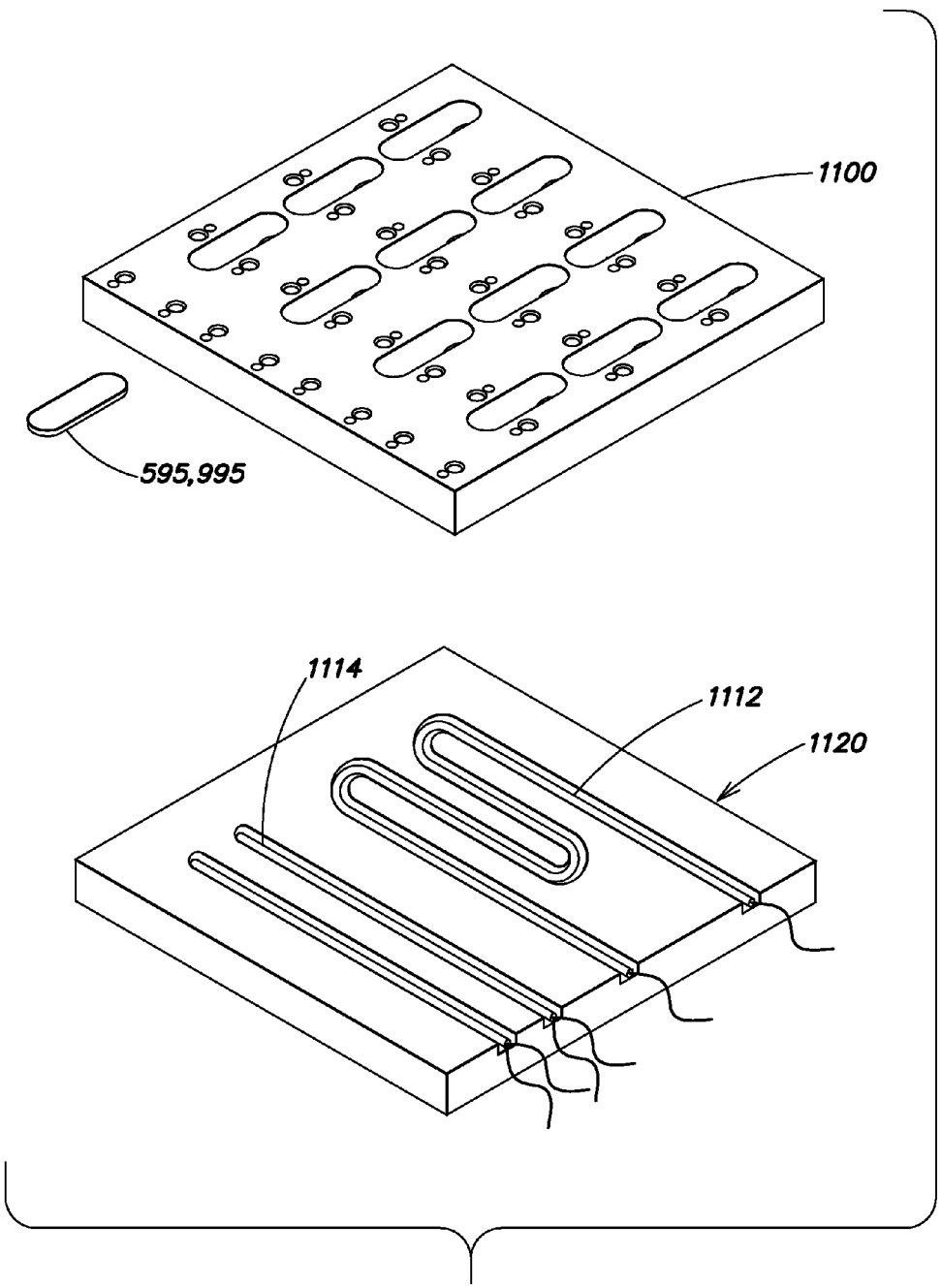
FIG. 11B illustrates the manner in which a single fluid substrate may be used to implement all or a portion of a heated gas panel in accordance with another embodiment of the present invention.

FIGS. 11A and 11B illustrate a number of further aspects of the present invention. As shown in FIGS. 11A and 11B, rather than using a number of flow substrates to form a gas stick or an entire gas panel, a single block of material 1100 may be used to form a gas stick or an entire gas panel. FIG. 11A also illustrates how a back-up plate 1120 may be used to reinforce the cap (or caps) for higher pressure applications. For example, when used with an integrated thin weld cap such as that shown in FIGS. 1A-J in which multiple pathway sealing weld locations are defined (e.g., by grooves 123 shown in FIG. 1I) in a thin sheet of material, a back-up plate 1120 may be desired to reinforce the weld cap, especially for high pressure applications. The back-up plate 1120 may be formed from a metallic material, such as aluminum, or a non-metallic material such as plastic. As also shown in FIG. 11A, a sheet heater 1110 may be located between the flow substrate (with associated cap or caps) and the back-up plate 1120. The combination of a thin integrated cap with sheet heater and back-up plate securely seals the fluid pathways for use at higher pressures, while allowing heat to be readily transmitted to the fluids flowing therein. As shown in FIG. 11B, rather than using an integrated weld cap, multiple individual weld caps, such as weld caps 595 and 995 (FIGS. 5 and 9) may be used. FIG. 11B further shows that rather than using a sheet heater 1110, a serpentine heater 1112 may be used that is embedded in a serpentine shaped groove in the back-up plate 1120, or alternatively still, a number of conventional cartridge-type heaters 1114 may be used.

It should be appreciated that the back-up plate shown in FIG. 11A may not only be used with the thin weld cap used in the embodiment of FIGS. 1A-J, but may also be used with the embodiment of FIGS. 10A-E to compress each of the o-ring seals used to seal each fluid pathway. Moreover, where the body of the flow substrate is formed from a non-metallic material, the back-up plate 1120 could be formed from a metallic material to provide additional support for any fluid component mounting. For example, fluid handling components disposed on the top surface of the flow substrate could then be down mounted to the body of the flow substrate via threaded fasteners that extend through holes formed in the body of the substrate and are received in threaded apertures of the back-up plate 1120.

Figure 12A:
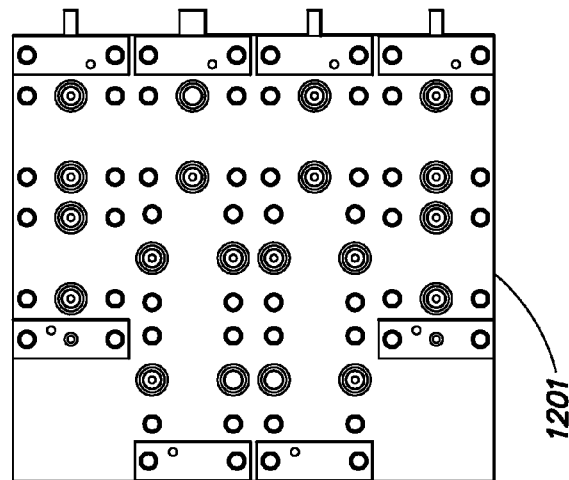
FIG. 12A illustrates a fluid flow panel for use with liquids and gases in which the entire fluid panel is implemented with two fluid flow substrates in accordance with an embodiment of the present invention.
Figure 12A:
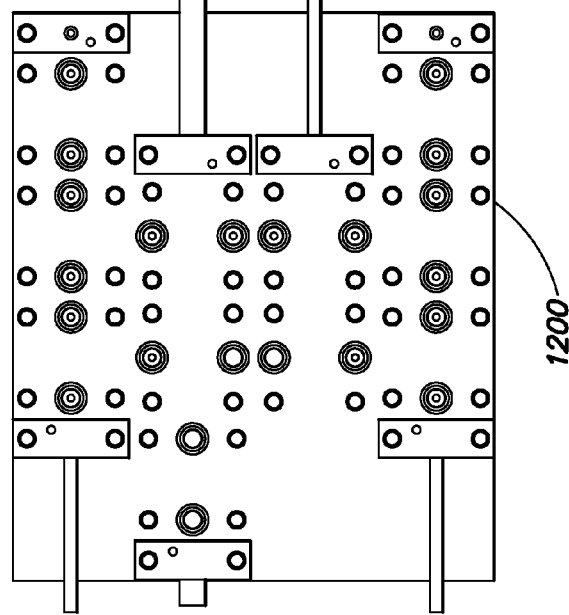
Figure 12B:
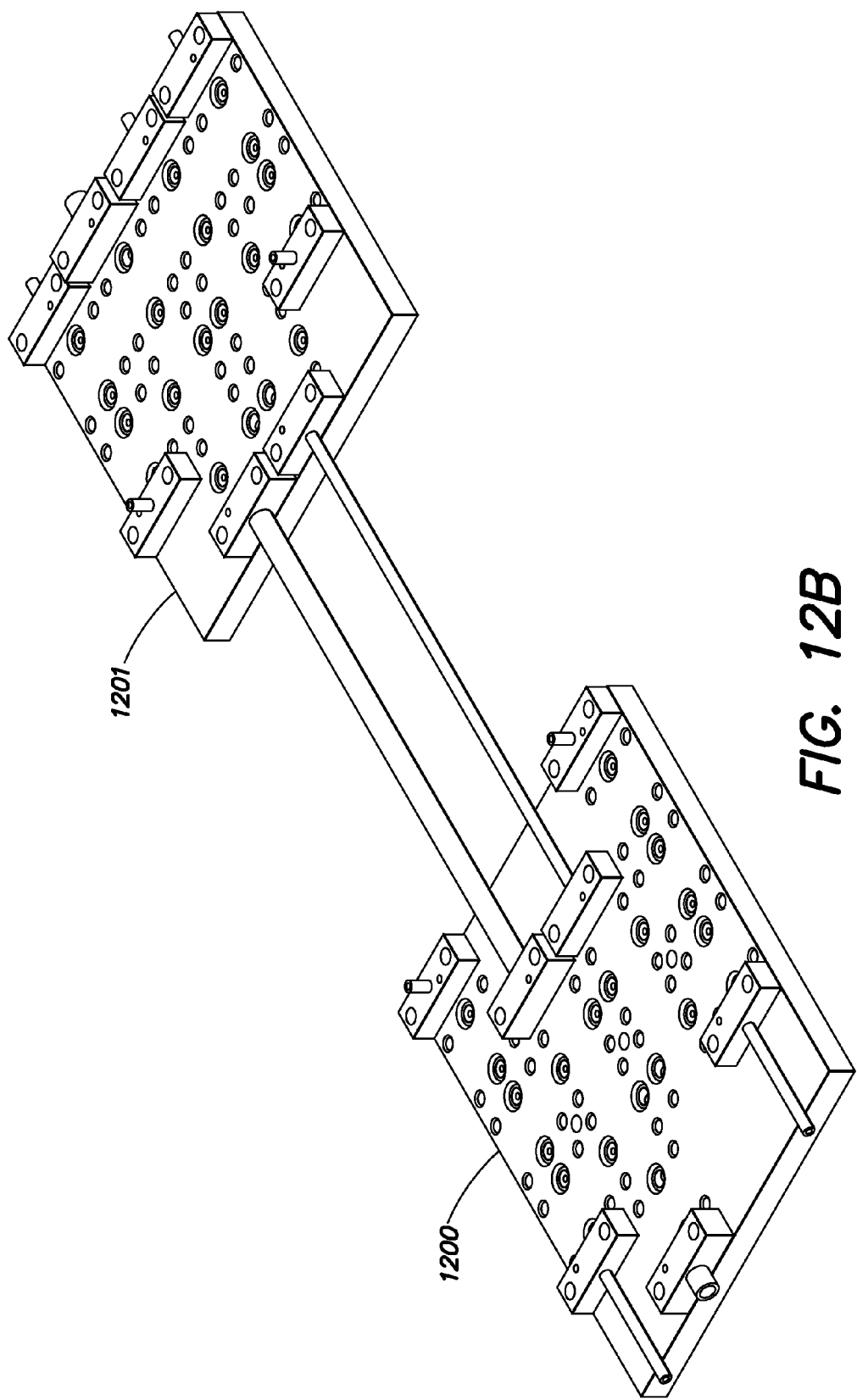
FIG. 12B illustrates an elevational view of the fluid flow panel of FIG. 12A.
Figure 12C:
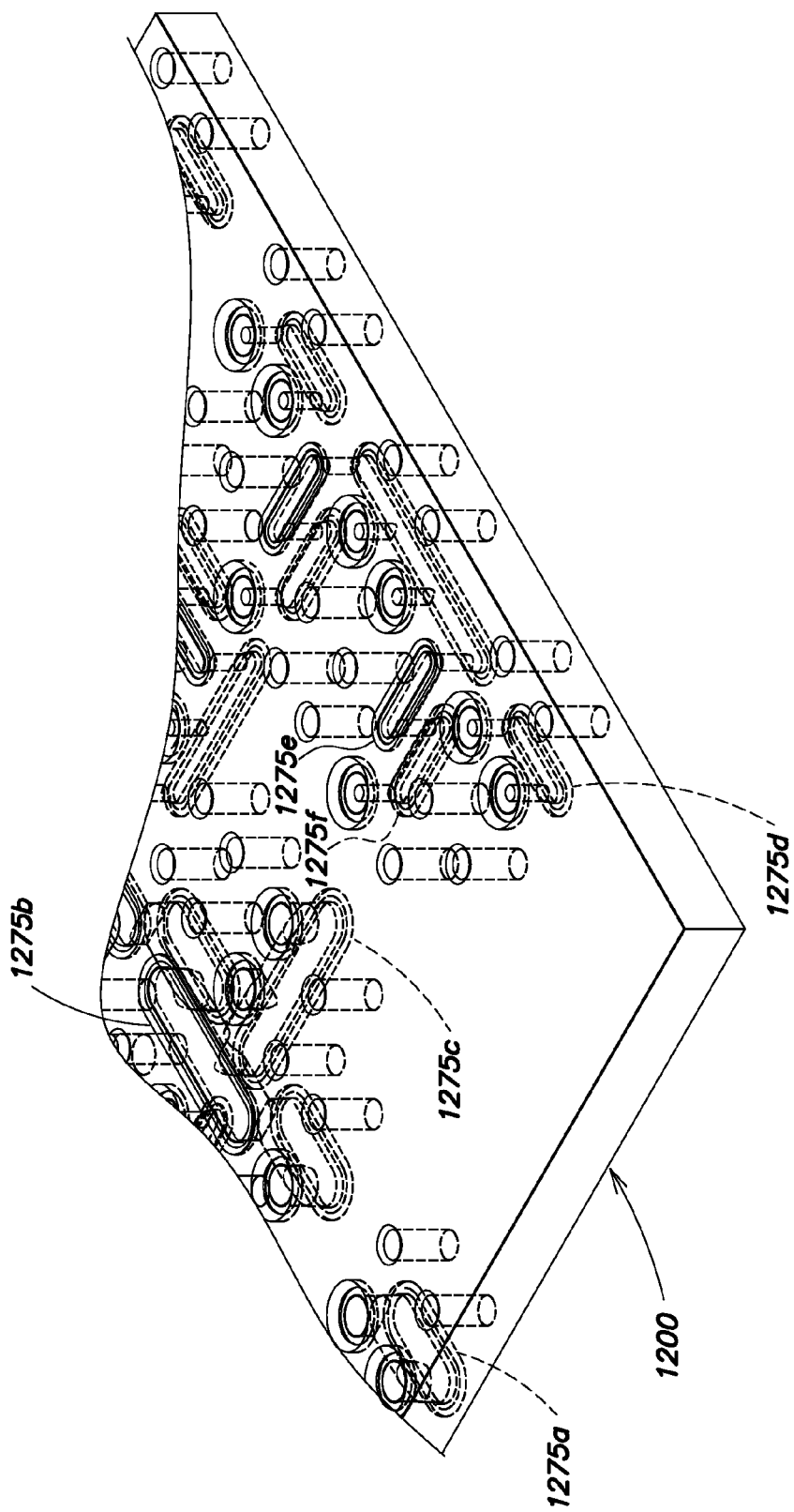
FIG. 12C illustrates a portion of the fluid flow panel of FIGS. 12A-B in which fluid pathways formed within the fluid flow substrate are visible.

FIGS. 12A-C illustrate a gas panel for use with liquids, gases, or combinations of liquids and gases that exemplifies several additional aspects of the present invention. For example, as shown in FIG. 12A, an entire gas panel may be formed using only two flow substrates 1200, 1201, each of which incorporate several gas sticks (individual gas sticks in a given substrate would convey fluids from left to right in FIG. 12A). Further, as shown in FIGS. 12A-C, the substrates 1200, 1201 of this embodiment are adapted for use with fluid handling components having symmetric port placement, such as W-Seal™ device, rather than those having asymmetric port placement. Moreover, as can be seen most clearly in FIG. 12C, the substrate 1200 may include fluid pathways having different flow capacities, fluid pathways oriented in different directions, and/or fluid pathways formed in opposing surfaces of the body of the substrate. For example, as shown in FIG. 12C, the substrate 1200 may include larger diameter fluid pathways 1275*a*, 1275*b*, 1275*c* formed in a bottom surface (pathway 1275*a*) or a top surface (fluid pathway 1275*b*) of the substrate 1200 to convey fluid in a first direction, or in a second direction (fluid pathway 1275*c*). Such larger diameter fluid pathways may be used to convey a purge gas or fluid, such as argon. The flow substrate may also include smaller diameter fluid pathways 1275*d*, 1275*e*, 1275*f* formed in a top surface or a bottom surface (fluid pathway 1275*d*) of the substrate 1200 to convey a fluid in the first direction, as well as smaller diameter fluid pathways formed in a top surface (fluid pathway 1275*e*) or a bottom surface (fluid pathway 1275*f*) to convey a fluid in the second direction. The smaller diameter fluid pathways 1275*d*, 1275*e*, and 1275*f* may be used to convey solvents or other liquids or gases. Although the embodiment illustrated in FIGS. 12A-C is adapted for use with a metal weld cap that is welded to the body of the substrate, it should be appreciated that this embodiment could alternatively be adapted for use with elastomeric seals. For example, for those fluid pathways formed in the bottom surface of the substrate, a backup plate (such as that described with respect to FIGS. 11A and 11B) could be used to compress the cap and elastomeric seals, while those fluid pathways formed in the top surface of the substrate could be formed so that fluid components mounted in registration with the top surface of the substrate are down mounted over the cap and seal and compress the associated cap and seal when fastened from above in sealing engagement with the conduit ports in the substrate.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A flow substrate comprising:
   a substrate body formed from a solid block of a first material, the substrate body having a first surface and a second surface opposing the first surface;
   a plurality of pairs of component conduit ports defined in the first surface of the substrate body;
   a plurality of fluid pathways extending between each respective pair of component conduit ports and in fluid communication with each component conduit port of the respective pair of component conduit ports, each respective fluid pathway being formed in the second surface of the substrate body; and
   at least one cap formed from a second material, the at least one cap having a first surface that is constructed to seal at least one fluid pathway of the plurality of fluid pathways, and a second surface opposing the first surface of the at least one cap;
   wherein the substrate body includes a weld formation formed in the second surface of the substrate body and surrounding the at least one fluid pathway to facilitate welding of the at least one cap to the substrate body along the weld formation, the weld formation including a recessed flat wall surface surrounding the at least one fluid pathway and a swaged lip, the recessed flat wall surface being recessed from the second surface of the substrate body and having an inner edge and an outer edge, and the swaged lip being disposed adjacent the inner edge of the recessed flat wall surface.

2. The flow substrate of claim 1, wherein the component conduit ports extend through the substrate body to the second surface of the substrate body.

3. The flow substrate of claim 1, wherein the first material and the second material are stainless steel of the same alloy type.

4. The flow substrate of claim 1, wherein the weld formation further includes a stress relief groove surrounding the outer edge of the recessed flat wall surface.

5. The flow substrate of claim 1, wherein the flow substrate forms a portion of a gas stick for conveying one of semiconductor process fluids and sampling fluids and petrochemical fluids.

6. The flow substrate of claim 1, wherein the flow substrate forms substantially all of a fluid delivery panel.

7. The flow substrate of claim 1, wherein a first fluid pathway of the plurality of fluid pathways has a different cross-sectional area than a second fluid pathway of the plurality of fluid pathways.

8. The flow substrate of claim 1, wherein the plurality of fluid pathways are a first plurality of fluid pathways that extend between each respective pair of component conduit ports in a first direction, and wherein the flow substrate further includes at least one second fluid pathway formed in one of the first surface and the second surface of the substrate body that extends in a second direction that is transverse to the first direction.

9. The flow substrate of claim 1, wherein the swaged lip extends from the recessed flat wall surface and toward the second surface of the substrate body but does not extend past the second surface of the substrate body.

10. The flow substrate of claim 1, wherein the recessed flat wall surface is recessed from the second surface of the substrate body by a distance sufficient to allow a weld formed between the at least one cap and the substrate body to be recessed from the second surface of the substrate body without any further surface preparation of the weld.

11. The flow substrate of claim 10, wherein the swaged lip extends from the recessed flat wall surface and toward the second surface of the substrate body but does not extend past the second surface of the substrate body.

12. The flow substrate of claim 11, wherein the weld formation further includes a weld edge formed in the second surface of the substrate body surrounding the at least one fluid pathway and dimensioned to receive the at least one cap.

13. The flow substrate of claim 12, where the weld formation further includes a stress relief groove surrounding the outer edge of the recessed flat wall surface.

14. The flow substrate of claim 1, wherein the at least one cap includes a plurality of caps corresponding to each of the plurality of fluid pathways.

15. The flow substrate of claim 14, wherein the substrate body includes a plurality of weld formations formed in the second surface of the substrate body, each respective weld formation of the plurality of weld formations surrounding a respective fluid pathway of the plurality of fluid pathways, each respective weld formation including a respective recessed flat wall surface surrounding the respective fluid pathway and a respective swaged lip.

16. The flow substrate of claim 15, wherein each respective weld formation further includes a stress relief groove surrounding the respective recessed flat wall surface.

* * * * *